United States Patent
Sant et al.

(10) Patent No.: US 11,858,865 B2
(45) Date of Patent: *Jan. 2, 2024

(54) FORMULATIONS AND PROCESSING OF CEMENTITIOUS COMPONENTS TO MEET TARGET STRENGTH AND CO2 UPTAKE CRITERIA

(71) Applicant: The Regents of the University of California, Oakland, CA (US)

(72) Inventors: Gaurav Sant, Los Angeles, CA (US); Iman Mehdipour, Los Angeles, CA (US); Gabriel D. Falzone, Los Angeles, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/840,809

(22) Filed: Jun. 15, 2022

(65) Prior Publication Data

US 2022/0380265 A1    Dec. 1, 2022

Related U.S. Application Data

(63) Continuation of application No. 16/821,478, filed on Mar. 17, 2020, now Pat. No. 11,384,029.

(60) Provisional application No. 62/819,895, filed on Mar. 18, 2019.

(51) Int. Cl.
*C04B 40/02* (2006.01)
*C04B 2/02* (2006.01)

(52) U.S. Cl.
CPC ............ *C04B 40/0231* (2013.01); *C04B 2/02* (2013.01); *C04B 40/0263* (2013.01)

(58) Field of Classification Search
CPC ......... C04B 2/02; C04B 18/08; C04B 22/064; C04B 28/04; C04B 28/10; C04B 40/0231; C04B 40/0263; C04B 40/0281; Y02P 40/18; Y02W 30/91
See application file for complete search history.

(56) References Cited

U.S. PATENT DOCUMENTS

| | | |
|---|---|---|
| 2,117,348 A | 5/1938 | Muskat |
| 4,318,996 A | 3/1982 | Magder |
| 4,379,870 A | 4/1983 | Matsumoto |
| 4,432,666 A | 2/1984 | Frey |
| 4,452,635 A | 6/1984 | Noshi |
| 4,828,620 A | 5/1989 | Mallow |
| 5,435,846 A | 7/1995 | Tatematsu et al. |
| 5,518,540 A | 5/1996 | Jones, Jr. |
| 5,744,078 A | 4/1998 | Soroushian |
| 5,798,328 A | 8/1998 | Kottwitz et al. |
| 5,928,420 A | 7/1999 | Oates et al. |
| 6,264,736 B1 | 7/2001 | Knopf |
| 6,569,923 B1 | 5/2003 | Slagter |
| 7,413,014 B2 | 8/2008 | Chatterji et al. |
| 7,879,305 B2 | 2/2011 | Reddy et al. |
| 8,021,477 B2 | 9/2011 | Brown et al. |
| 8,088,292 B2 | 1/2012 | Neumann et al. |
| 8,163,066 B2 | 4/2012 | Eisenberger |
| 8,252,242 B2 | 8/2012 | Vandor |
| 8,262,777 B2 | 9/2012 | Neumann et al. |
| 8,333,944 B2 | 12/2012 | Constantz |
| 8,383,072 B2 | 2/2013 | Smedley et al. |
| 8,507,228 B2 | 8/2013 | Simpson et al. |
| 8,852,319 B2 | 10/2014 | Wijmans et al. |
| 8,864,876 B2 | 10/2014 | Neumann et al. |
| 8,894,747 B2 | 11/2014 | Eisenberger et al. |
| 9,061,237 B2 | 6/2015 | Eisenberger et al. |
| 9,163,297 B2 | 10/2015 | Langley |
| 9,205,371 B2 | 12/2015 | Cooper et al. |
| 9,221,027 B2 | 12/2015 | Kuppler et al. |
| 9,227,153 B2 | 1/2016 | Eisenberger |
| 9,382,120 B2 | 7/2016 | Dakhil |
| 9,382,157 B2 | 7/2016 | Guzzetta et al. |
| 9,433,886 B2 | 9/2016 | Smedley et al. |
| 9,440,189 B2 | 9/2016 | Mercier et al. |
| 9,469,547 B2 | 10/2016 | Kniesburges |
| 9,475,000 B2 | 10/2016 | Benyahia |
| 9,555,365 B2 | 1/2017 | Eisenberger et al. |
| 9,714,406 B2 | 7/2017 | Constantz et al. |
| 9,786,940 B2 | 10/2017 | Langley |

(Continued)

FOREIGN PATENT DOCUMENTS

| | | |
|---|---|---|
| JP | H05294693 A | 11/1993 |
| JP | H05330878 A | 12/1993 |

(Continued)

OTHER PUBLICATIONS

Examination Report on IN 201927016758 dated Dec. 14, 2020 (5 pages).
Extended European Search Report on EP Application No. 17865241.8 dated May 15, 2020, 6 pages.
Falzone et al., "New insights into the mechanisms of carbon dioxide mineralization by portlandite", AIChE Journal, 67(5), p. e17160, 2021.
International Preliminary Report on Patentability for PCT/US2017/058359 dated May 9, 2019, 7 pages.
International Search Report and Written Opinion, issued in International Application No. PCT/US2017/058359, 8 pages (Jan. 9, 2018).

(Continued)

*Primary Examiner* — Anthony J Green
(74) *Attorney, Agent, or Firm* — Foley Hoag LLP; David P. Halstead; Hilary Dorr Lang

(57) ABSTRACT

Provided herein are compositions and methods of carbonation processing for the fabrication of cementitious materials and concrete products. Embodiments include manufacturing processes of a low-carbon concrete product comprising: forming a cementitious slurry including portlandite; shaping the cementitious slurry into a structural component; and exposing the structural component to a $CO_2$ waste stream, thereby enabling manufacture of the low-carbon concrete product.

16 Claims, 20 Drawing Sheets

(56) References Cited

U.S. PATENT DOCUMENTS

| | | | |
|---|---|---|---|
| 9,789,439 | B2 | 10/2017 | Siller et al. |
| 9,808,759 | B2 | 11/2017 | Balfe et al. |
| 9,861,931 | B2 | 1/2018 | Kuopanportti et al. |
| 10,017,739 | B2 | 7/2018 | Tedder et al. |
| 10,233,127 | B2 | 3/2019 | Atakan |
| 10,351,478 | B2 | 7/2019 | Quinn et al. |
| 10,392,305 | B2 | 8/2019 | Wang et al. |
| 10,668,443 | B2 | 6/2020 | Kuppler et al. |
| 10,781,140 | B2 | 9/2020 | Patten et al. |
| 10,968,142 | B2 | 4/2021 | Sant et al. |
| 11,040,898 | B2 | 6/2021 | Sant et al. |
| 11,230,473 | B2 | 1/2022 | Sant et al. |
| 11,339,094 | B2 | 5/2022 | Sant et al. |
| 11,384,029 | B2 * | 7/2022 | Sant ................ C04B 40/0263 |
| 11,746,049 | B2 | 9/2023 | Sant et al. |
| 2001/0023655 | A1 | 9/2001 | Knopf |
| 2002/0158018 | A1 | 10/2002 | Abramowitz et al. |
| 2002/0168473 | A1 | 11/2002 | Ottersbach |
| 2004/0077787 | A1 | 4/2004 | Karande |
| 2005/0238563 | A1 | 10/2005 | Eighmy et al. |
| 2006/0247450 | A1 | 11/2006 | Wu et al. |
| 2007/0186821 | A1 | 8/2007 | Brown et al. |
| 2008/0004449 | A1 | 1/2008 | Yong et al. |
| 2008/0156232 | A1 | 7/2008 | Crudden |
| 2008/0245274 | A1 | 10/2008 | Ramme |
| 2009/0081096 | A1 | 3/2009 | Pellegrin |
| 2009/0169452 | A1 | 7/2009 | Constantz et al. |
| 2009/0214408 | A1 | 8/2009 | Blake et al. |
| 2010/0083880 | A1 | 4/2010 | Constantz et al. |
| 2010/0251632 | A1 | 10/2010 | Chen |
| 2011/0006700 | A1 | 1/2011 | Chen et al. |
| 2011/0033239 | A1 | 2/2011 | Constantz et al. |
| 2011/0174156 | A1 | 7/2011 | Saunders et al. |
| 2011/0268633 | A1 | 11/2011 | Zou |
| 2011/0290155 | A1 | 12/2011 | Vlasopoulos |
| 2012/0082839 | A1 | 4/2012 | Ha |
| 2013/0008355 | A1 | 1/2013 | Stokes |
| 2013/0036945 | A1 | 2/2013 | Constantz et al. |
| 2013/0167756 | A1 | 7/2013 | Chen et al. |
| 2014/0097557 | A1 | 4/2014 | Alhozaimy |
| 2014/0197563 | A1 | 7/2014 | Niven |
| 2014/0356267 | A1 | 12/2014 | Hunwick |
| 2015/0225295 | A1 | 8/2015 | McCandlish et al. |
| 2015/0307400 | A1 | 10/2015 | Devenney |
| 2016/0082387 | A1 | 3/2016 | Constantz et al. |
| 2017/0182458 | A1 | 6/2017 | Jiang et al. |
| 2017/0226021 | A1 | 8/2017 | Sant et al. |
| 2018/0238157 | A1 | 8/2018 | Fu et al. |
| 2018/0341887 | A1 | 11/2018 | Kislovskiy et al. |
| 2019/0177220 | A1 | 6/2019 | Sant et al. |
| 2019/0367390 | A1 | 12/2019 | Sant et al. |
| 2020/0180964 | A1 | 6/2020 | Sant et al. |
| 2020/0299203 | A1 | 9/2020 | Sant et al. |
| 2021/0024364 | A1 | 1/2021 | Sant et al. |
| 2021/0188671 | A1 | 6/2021 | Sant et al. |
| 2021/0198157 | A1 | 7/2021 | Sant et al. |
| 2022/0064066 | A1 | 3/2022 | Sant et al. |
| 2022/0204401 | A1 | 6/2022 | Sant et al. |
| 2022/0212935 | A1 | 7/2022 | Sant et al. |
| 2022/0380265 | A1 | 12/2022 | Sant et al. |

FOREIGN PATENT DOCUMENTS

| | | |
|---|---|---|
| JP | 2002/145650 A | 5/2002 |
| WO | WO-2010/006242 A1 | 1/2010 |
| WO | WO-2014/005227 A1 | 1/2014 |
| WO | WO-2014/009802 A2 | 1/2014 |
| WO | WO-2015/154174 A1 | 10/2015 |
| WO | WO-2016/061251 A1 | 4/2016 |
| WO | WO-2018/081308 A1 | 5/2018 |
| WO | WO-2018/081310 A1 | 5/2018 |
| WO | WO-2019/006352 A1 | 1/2019 |
| WO | WO-2019/036386 A1 | 2/2019 |
| WO | WO-2019/036676 A1 | 2/2019 |

OTHER PUBLICATIONS

La Plante et al., "Controls on CO2 Mineralization Using Natural and Industrial Alkaline Solids under Ambient Conditions", ACS Sustainable Chem. Eng., 9(32), p. 10727-10739, 2021.

Mehdipour et al., "How Microstructure and Pore Moisture Affect Strength Gain in Portlandite-Enriched Composites That Mineralize CO2", ACS Sustainable Chem. Eng., 7(15), pp. 13053-13061, 2019.

Mehdipour et al., "The role of gas flow distributions on CO2 mineralization within monolithic cemented composites: coupled CFD-factorial design approach", Reaction Chemistry & Engineering 6 (3), pp. 494-504, 2021.

Murnandari et al., "Effect of process parameters on the CaCO3 production in the single process for carbon capture and mineralization", Korean Journal of Chemical Engineering, Mar. 2017, vol. 34, Issue 3, pp. 935-941.

Office Action on CN 201780076640.2 dated May 7, 2021.

Ramasubramanian et al., "Membrane processes for carbon capture from coal-fired power plant flue gas: A modeling and cost study," Journal of Membrane Science (2012) 421-422: 299-310.

Reddy et al., "Simultaneous capture and mineralization of coal combustion flue gas carbon dioxide (CO2)," Energy Procedia, 4, (2011), pp. 1574-1583.

Vance et al., "Direct Carbonation of Ca(OH)2 Using Liquid and Supercritical CO2: Implications for Carbon-Neutral Cementation", Ind. Eng. Chem. Res., 54(36), pp. 8908-8918, 2015.

Wei et al., "Clinkering-Free Cementation by Fly Ash Carbonation", Journal of CO2 Utilization, 23, pp. 117-127, 2018.

Buck., "Alkali Reactivity of Strained Quartz as a Constituent of Concrete Aggregate," Aug. 1983, 17 pages.

Communication Pursuant to Rules 70(2) and 70a(2) EPC on EP 18845904.4 dated Apr. 28, 2021.

Extended European Search Report on EP 18845904.4 dated Apr. 7, 2021.

Final Office Action on U.S. Appl. No. 15/519,524 dated Oct. 14, 2020.

Final Office Action on U.S. Appl. No. 15/519,524 dated Nov. 21, 2019, 14 pages.

International Preliminary Report on Patentability issued in PCT/US2018/040373 dated Jan. 9, 2020, 6 pages.

International Preliminary Report on Patentability on PCT/US2018/046557 dated Feb. 27, 2020.

International Search Report and Written Opinion for International Application No. PCT/US2015/055564 dated Jan. 22, 2016, 13 pages.

International Search Report and Written Opinion issued in PCT Application No. PCT/US2018/040373 dated Sep. 20, 2018, 7 pages.

International Search Report and Written Opinion, issued in corresponding International Appln. No. PCT/US2018/046557, 12 pages (dated Dec. 17, 2018).

Li et al., "pH control using polymer-supported phosponic acids as reusable buffer agents," Green Chem., 2015, vol. 17, pp. 3771-3774.

Non-Final Office Action on U.S. Appl. No. 15/519,524 dated Apr. 29, 2020, 12 pages.

Non-Final Office Action on U.S. Appl. No. 15/519,524 dated May 16, 2019, 13 pages.

Notice of Allowance on U.S. Appl. No. 15/519,524 dated Feb. 2, 2021.

Vega-Vila et al. "Metal cations as inorganic structure-directing agents during the synthesis of phillipsite and tobermorite", Reaction Chemistry and Engineering, Mar. 1, 2023, 8, pp. 1176-1184.

Wang et al., "Integration of CO2 capture and storage based on pH-swing mineral carbonation using recyclable ammonium salts," Energy Procedia 4, 2011, 4930-4936.

* cited by examiner

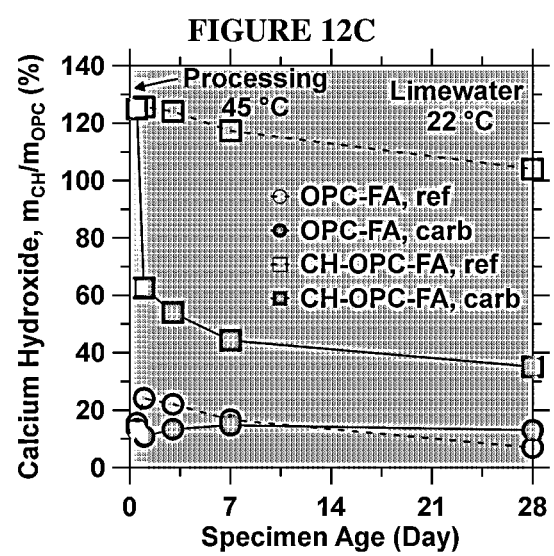

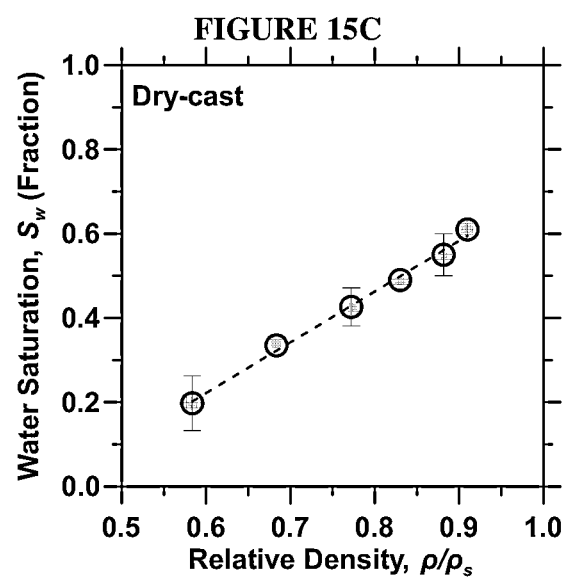

FORMULATIONS AND PROCESSING OF CEMENTITIOUS COMPONENTS TO MEET TARGET STRENGTH AND CO2 UPTAKE CRITERIA

CROSS-REFERENCE TO RELATED APPLICATIONS

This application is a continuation of U.S. patent application Ser. No. 16/821,478, filed Mar. 17, 2020, now U.S. Pat. No. 11,384,029, which claims the benefit of U.S. Provisional Patent Application No. 62/819,895, filed Mar. 18, 2019, each of which is incorporated by reference herein in its entirety.

STATEMENT REGARDING FEDERALLY SPONSORED RESEARCH OR DEVELOPMENT

This invention was made with government support under Grant Numbers DE-FE0029825 and DE-FE0031718, awarded by the Department of Energy. The government has certain rights in the invention.

BACKGROUND

Traditional concrete is a mixture of calcium silicate-dominant ordinary portland cement ("OPC"), mineral aggregates, water, and chemical additives. The reaction of OPC with water (hydration) forms calcium silicate hydrate (C-S-H) compounds. The precipitation of C-S-H between proximate particles induces cohesion/hardening, and the resulting porosity reduction and refinement strengthen the concrete. Due to the significant impact of the construction industry on climate change, there is a pressing demand to implement OPC-alternative cementation solutions with significantly reduced embodied $CO_2$ intensities. Over 30 billion metric tons of concrete are produced per year, involving the production of over 4.5 billion metric tons of cement, with $CO_2$ emissions intensity on the order of 0.8-0.9 kg $CO_2$/kg cement. Emissions associated with cement production make up over 5% of global $CO_2$ emissions, contributing significantly to global climate change.

It is against this background that a need arose to develop the embodiments described herein.

SUMMARY

Provided herein are manufacturing processes for forming cemented siliceous solids.

Some embodiments of the present disclosure include a manufacturing process of a low-carbon concrete product, comprising: forming a cementitious slurry including portlandite; shaping the cementitious slurry into a structural component; and exposing the structural component to a post-combustion or post-calcination flue gas stream containing $CO_2$, thereby enabling manufacture of the low-carbon concrete product. In some embodiments, forming the cementitious slurry includes combining water and a binder including the portlandite (e.g., as the primary feedstock), and optionally cement and coal combustion residuals (e.g., fly ash) at a water-to-binder mass ratio (w/b) of about 0.5 or less. In some embodiments, w/b is about 0.45 or less, about 0.4 or less, about 0.35 or less, or about 0.3 or less, and down to about 0.25 or less. In some embodiments, forming the cementitious slurry includes combining water and a binder including a cement, portlandite, and coal combustion residuals, at a mass percentage of the cement in the binder of about 25% or greater and up to about 50%. In some embodiments, the mass percentage of the cement in the binder is about 30% or greater, about 35% or greater, about 40% or greater, or about 45% or greater, and up to about 50%. Some embodiments further comprise drying the structural component prior to exposing the structural component to carbon dioxide. In some embodiments, drying the structural component includes reducing a degree of pore saturation ($S_w$) to less than 1. In some embodiments, $S_w$ is about 0.9 or less, about 0.8 or less, about 0.7 or less, about 0.6 or less, about 0.5 or less, or about 0.4 or less, and down to about 0.1. In some embodiments, drying the structural component includes reducing $S_w$ to a range of about 0.1 to about 0.7, about 0.2 to about 0.6, about 0.2 to about 0.5, or about 0.2 to about 0.4. In some embodiments, drying the structural component is performed at a temperature in a range of about 20° C. to about 85° C., about 30° C. to about 65° C., or about 35° C. to about 55° C., for a time duration in a range of 1 h to about 72 h. In some embodiments, a green body structural component is produced either by compacting the cementitious slurry (e.g., dry-casting) or by pouring the slurry in to a mold (e.g., wet-casting) to form the structural component. In some embodiments, compacting the cementitious slurry includes reducing $S_w$ to less than 1. In some embodiments, $S_w$ is about 0.9 or less, about 0.8 or less, about 0.7 or less, about 0.6 or less, about 0.5 or less, or about 0.4 or less, and down to about 0.1. In some embodiments, compacting the cementitious slurry includes reducing $S_w$ to a range of about 0.1 to about 0.7, about 0.2 to about 0.6, about 0.2 to about 0.5, or about 0.2 to about 0.4. In some embodiments, compacting the cementitious slurry is performed at a pressure in a range of about 0.5 MPa to about 50 MPa. In some embodiments, exposing the structural component to carbon dioxide is performed at a temperature in a range of about 20° C. to about 85° C., about 30° C. to about 75° C., about 35° C. to about 70° C., or about 40° C. to about 65° C. In some embodiments, the low-carbon concrete product have up to 75% lower embodied carbon intensity than a traditional cement-based concrete product. In some embodiments, the lower carbon intensity is due to (a) partial substitution of cement with portlandite and/or fly ash and/or (b) $CO_2$ uptake during manufacturing, Some embodiments of the present disclosure include manufacturing process of a low-carbon concrete product, comprising: providing a target compressive strength of the concrete product; providing a prediction model relating carbon dioxide uptake to compressive strength; forming a cementitious slurry including portlandite; forming the cementitious slurry into a structural component; and exposing the structural component to carbon dioxide, thereby forming the low-carbon concrete product, wherein exposing the structural component to carbon dioxide includes monitoring carbon dioxide uptake of the structural component, and exposing the structural component to carbon dioxide is performed at least until the carbon dioxide uptake of the structural component is indicative of meeting the target compressive strength according to the prediction model. In some embodiments, the carbon dioxide is contained within a post-combustion or post-calcination flue gas stream

BRIEF DESCRIPTION OF DRAWINGS

FIG. 9B shows 60-h $CO_2$ uptake as a function of the non-evaporable water content $w_n/m_{OPC}$ of dry-cast and wet-cast composites following carbonation. The degree of OPC hydration for the dry-cast and wet-cast composites were estimated between 9.1%-20.8% and 45.2%-60.1%, respectively, using thermogravimetric analysis (TGA). The lower and upper bounds of $w_n/m_{OPC}$ in FIG. 9C for each data point correspond to values at t=0 h and t=60 h of carbonation, respectively. The specimens with initial $S_w<S_{w,c}$ are excluded in FIG. 9C.

FIG. 12C shows the evolution of normalized calcium hydroxide content in wet-cast portlandite-enriched (CH-OPC-FA) and portlandite-free (OPC-FA) composites during drying, carbonation, and limewater curing. The results of non-carbonated specimens with and without portlandite are also shown for comparison. The carbonated specimens were dried at 45° C. for 12 h then exposed to $CO_2$ for 12 h at 45° C., whereas the non-carbonated specimens were dried at 45° C. for 24 h before limewater curing. Carbonation was carried out using 12% $CO_2$ [v/v]. As indicated in FIG. 12A, the portlandite-enriched (CH-OPC-FA) composites featured 4.3× higher $CO_2$ uptake than portlandite-free (OPC-FA) composites. The "pink-shaded" and "blue-shaded" regions indicate vapor-phase processing (drying and carbonation) and limewater curing durations.

FIG. 15C shows compaction-dependent $S_w$ for the dry-cast composites at varying compaction levels.

DETAILED DESCRIPTION

Figure 1:
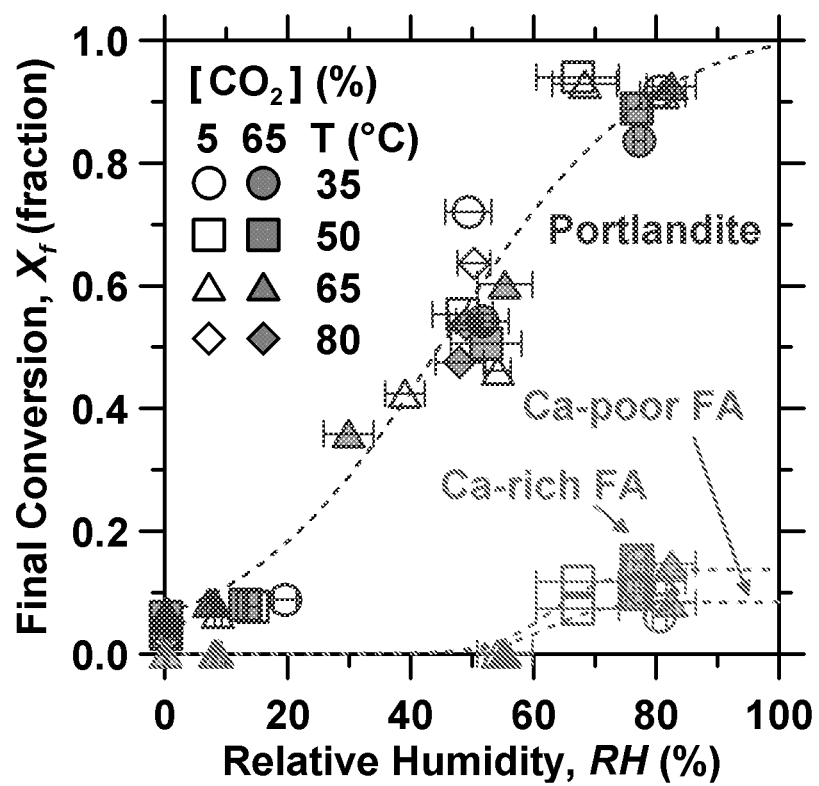
FIG. 1 shows portlandite and fly ash (FA) particles that demonstrate sigmoidal trends in final conversion $X_f$ that increase with relative humidity RH and are independent of temperature T and $CO_2$ concentration $[CO_2]$.

Embodiments of this disclosure are directed to compositions and methods of carbonation processing for the fabrication of cementitious materials and concrete products that meet design criteria of compressive strength and $CO_2$ uptake. Compressive strength is a design criterion that indicates the mechanical performance of concrete materials and pre-fabricated concrete products (e.g., concrete masonry units, beams, slabs, and so forth). The $CO_2$ uptake (quantified as a mass of $CO_2$ incorporated into solid products per mass of initial solid material) describes the material's efficiency in sequestering gaseous $CO_2$ into stable solids. Enhancing $CO_2$ uptake reduces a material's embodied $CO_2$ emissions footprint, and allows impactful removal of gaseous $CO_2$ from industrial emissions sources. Together, these metrics describe the fundamental design criteria for producing construction products with carbonate-based binders that incorporate alkaline solid wastes and flue gas $CO_2$ streams.

In an aspect according to some embodiments, a manufacturing process of a low-carbon concrete product includes: (1) forming a cementitious slurry including portlandite; (2) shaping the cementitious slurry into a structural component; and (3) exposing the structural component to a $CO_2$ waste stream, such as a post-combustion or post-calcination flue gas stream containing carbon dioxide, thereby enabling manufacture of the low-carbon concrete product. It is understood that, in some embodiments, the amount of carbon dioxide in the $CO_2$ waste stream (e.g., post-combustion or post-calcination flue gas stream) is greater than concentration of carbon dioxide typically in the atmosphere.

In some embodiments, the process operates, effectively, at ambient pressure and/or gas temperatures. For example, in come embodiments, step (3) is performed at an ambient pressure. In some embodiments, the pressure is about 0.5 to about 10 atm, e.g., about 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9 or 10 atm. In some embodiments, step (3) is performed at an ambient temperature. in some embodiments, the temperature is about 15° C. to about to about 80° C., e.g., about 15, 20, 25, 30, 35, 40, 45, 50, 55, 60, 65, 70, 75 or 80° C.

In some embodiments, forming the cementitious slurry includes combining water and a binder including the portlandite, and optionally cement and coal combustion residuals (e.g. fly ash) at a water-to-binder mass ratio (w/b) of about 0.5 or less, about 0.45 or less, about 0.4 or less, about 0.35 or less, or about 0.3 or less, and down to about 0.25 or less.

The term coal combustion residuals has its typical meaning in the art. Coal combustion residuals can include coal ash, and can include components such as those residuals produced when coal is burned by power plants. Coal ash can include one or more of fly ash, bottom ash, and boiler slag. Fly ash is generally composed mostly of silica and can be made from the burning finely ground coal.

A post-combustion or post-calcination flue gas stream can be produced from coal fired power plants, and can include, e.g., 12.7% $CO_2$, 2.5% $O_2$, 66.7% $N_2$+Ar, 18.1% $H_2O$, 23 ppm $SO_2$, and 28 ppm $NO_x$. Furthermore, the portlandite carbonation and $CO_2$ mineralization reaction is insensitive to the presence of acid gases (e.g., $SO_x$ and $NO_x$) that may be contained in flue gas streams. In some embodiments, the post-combustion or post-calcination flue gas stream can be simulated flue gas, e.g., a gas stream that is the same or similar to a post-combustion or post-calcination flue gas stream from an industrial process, such as from coal fired power plants. In some embodiments, the post-combustion or post-calcination flue gas stream includes carbon dioxide in an amount of about 4, 5, 6, 7, 8, 9, 10, 11, 12, 13, 14, 15, 16, 17, 18, 19, or 20, up to 50%. In some embodiments, the $CO_2$ waste stream, such as the post-combustion or post-calcination flue gas stream, is diluted. For example, the stream may be diluted by 10, 20, 30, 40, 50, 60, 70, 80, or 90 percent from its original concentration. In some embodiments, the $CO_2$ waste stream, such as the post-combustion or post-calcination flue gas stream, is enriched. For example, the stream may be enriched by 10, 20, 30, 40, 50, 60, 70, 80, or 90 percent from its original concentration In some embodiments, forming the cementitious slurry includes combining water and a binder including a cement, portlandite, and coal combustion residuals at a mass percentage of the cement in the binder of about 25% or greater, about 30% or greater, about 35% or greater, about 40% or greater, or about 45% or greater, and up to about 50%.

In some embodiments, the manufacturing process includes drying the structural component prior to exposing the structural component to carbon dioxide. In some embodiments, drying the structural component includes reducing a fraction of pore volume that is saturated with liquid water ($S_w$) to less than 1, such as about 0.9 or less, about 0.8 or less, about 0.7 or less, about 0.6 or less, about 0.5 or less, or about 0.4 or less, and down to about 0.1. In some embodiments, drying the structural component includes reducing $S_w$ to a range of about 0.1 to about 0.7, about 0.2 to about 0.6, about 0.2 to about 0.5, or about 0.2 to about 0.4. In some embodiments, drying the structural component is performed at a temperature in a range of about 20° C. to about 85° C., about 30° C. to about 65° C., or about 35° C. to about 55° C., for a time duration in a range of 1 h to about 72 h.

In some embodiments, shaping the cementitious slurry includes compacting the cementitious slurry to form the structural component. For example, in some embodiments, shaping the cementitious slurry includes either compacting the cementitious slurry (dry-casting) or pouring the slurry in to a mold (wet-casting) to form the structural component. In some embodiments, compacting the cementitious slurry includes reducing a degree of pore water saturation ($S_w$) to less than 1, such as about 0.9 or less, about 0.8 or less, about 0.7 or less, about 0.6 or less, about 0.5 or less, or about 0.4 or less, and down to about 0.1. In some embodiments, compacting the cementitious slurry includes reducing $S_w$ to a range of about 0.1 to about 0.7, about 0.2 to about 0.6, about 0.2 to about 0.5, or about 0.2 to about 0.4. In some embodiments, compacting the cementitious slurry is performed at a pressure in a range of about 0.5 MPa to about 50 MPa, e.g., about 0.5, 1, 2, 3, 4, 5, 6, 7, 8, 9, 10, 11, 12, 13, 14, 15, 16, 17, 18, 19, 20, 21, 22, 23, 24, 25, 30, 35, 40, 45, or 50 MPa.

In some embodiments, exposing the structural component to carbon dioxide is performed at a temperature in a range of about 20° C. to about 85° C., about 30° C. to about 75° C., about 35° C. to about 70° C., or about 40° C. to about 65° C.

In some embodiments, the low-carbon concrete product have up to 75% lower carbon intensity than a traditional cement-based concrete product. In some embodiments, the lower carbon intensity is due to (a) partial substitution of cement with portlandite and fly ash and/or (b) $CO_2$ uptake during manufacturing. As understood by the skilled artisan, a traditional cement-based concrete product can have a carbon intensity of about 0.5 to about 1.5 tons of $CO_2$ per ton of OPC used in concrete products, e.g., about 0.5, 0.6, 0.7, 0.8, 0.9, 1, 1.1, 1.2, 1.3, 1.4, or 1.5 tons of $CO_2$ per ton of OPC used in concrete products. For example, a traditional cement-based concrete, and its products can have a carbon intensity of about 195 to about 771 kg $CO_2$e per m$^3$.

It will be understood that in some embodiments other benefits or aspects disclosed more specifically below are also applicable to the above-disclosed embodiments.

In another aspect according to some embodiments, a manufacturing process of a low-carbon concrete product includes: (1) providing a target compressive strength of the concrete product; (2) providing a prediction model relating carbon dioxide uptake to compressive strength; (3) forming a cementitious slurry including portlandite; (4) forming the cementitious slurry into a structural component; and (5) exposing the structural component to carbon dioxide, thereby forming the low-carbon concrete product, wherein exposing the structural component to carbon dioxide includes monitoring carbon dioxide uptake of the structural component, and exposing the structural component to carbon dioxide is performed at least until the carbon dioxide uptake of the structural component is indicative of meeting the target compressive strength according to the prediction model.

In some embodiments, the carbon dioxide is contained within a $CO_2$ waste stream, such as a post-combustion or post-calcination flue gas stream, such as those described elsewhere herein.

Specific Embodiments and Examples

The following embodiments and examples describes specific aspects of some embodiments of this disclosure to illustrate and provide a description for those of ordinary skill in the art. These embodiments and examples should not be construed as limiting this disclosure, as the embodiments and examples merely provides specific methodology useful in understanding and practicing some embodiments of this disclosure.

Overview

In certain embodiments, a cementation solution is mineral carbonation ($CO_2$ mineralization), which is the reaction of $CO_2$ with inorganic precursors to produce stable carbonate solids. Such reactions can be exploited to produce cement-replacement materials while sequestering $CO_2$ from industrial emissions streams. To achieve cementation by carbonation, a shape-stabilized "green-body" (e.g., block, slab, beam, and so forth) is exposed to fluid $CO_2$ (e.g., gas or liquid). Such in situ $CO_2$ mineralization is a multi-stage process that typically proceeds via dissolution-precipitation (rather than direct solid-gas reaction), namely in some embodiments, the multi-stage process can proceed via the following stages (for calcium-bearing reactants):

1) Dissolution of reactants to yield $Ca^{2+}$ within liquid water in pore network/water films at reactant surfaces,
2) Transport of $CO_2$ through the green body's pore network towards pore water,
3) Dissolution of $CO_2$ in pore water and speciation to $HCO_3^-$ or $CO_3^{2-}$, and
4) Reaction of dissolved species to precipitate mineral carbonates (e.g., $CaCO_3$).

In addition to $CO_2$ sequestered into solid products, the embodied $CO_2$ emissions of carbonating binders may be reduced vis-à-vis OPC by diminishing production and use of OPC. This is because the reactants can be industrial wastes (e.g., coal fly ash) and/or phases produced via lower-temperature routes (e.g., portlandite or $Ca(OH)_2$). $CO_2$ mineralization of portlandite with flue gas is thermodynamically favored at near-ambient temperatures. The final carbonation conversion of portlandite particulates is found to be controlled by the relative humidity RH of the contacting gas stream—i.e., independent of temperature T and $CO_2$ concentration $[CO_2]$ (FIG. 1). The weak dependence of portlandite particulate carbonation to $CO_2$ concentration suggests that substantially enhancement of the $CO_2$ concentration beyond that typical to flue gases, e.g., by membrane enrichment, is unlikely to yield proportional increases in the reaction kinetics of portlandite particles. This finding highlights the suitability of portlandite carbonation within process cycles that use (un-enriched) post-combustion gas streams, which may be secured from natural gas or coal-fired power generation systems.

For readily-dissolved reactants such as portlandite, a constraint on carbonation rates is $CO_2$ transport, which depends, in part, on the presence of liquid water in the green body. Liquid water in pore networks retards $CO_2$ transport by physical hindrance, since $CO_2$ diffusion in water is about $10^5$ times slower than in air. The strengthening of binders containing rapidly dissolved Ca-bearing phases along with fly ash and OPC is a complex process, as strengthening is induced by precipitation of both carbonates and of C-S-H (formed by OPC hydration and pozzolanic reactions of $Ca(OH)_2$ with aluminosilicate sources such as fly ash).

Figure 2A:
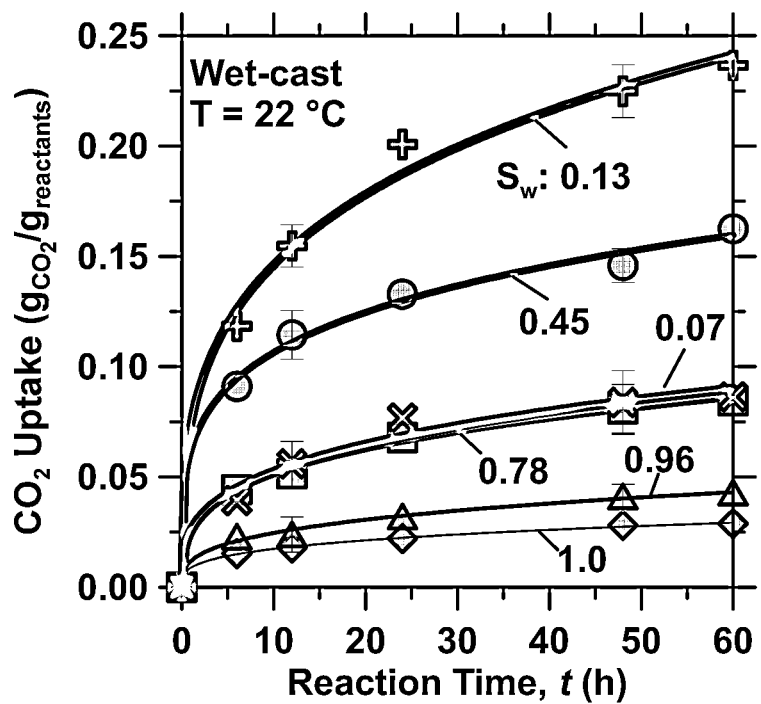
FIG. 2A shows the time-dependent $CO_2$ uptake of wet-cast portlandite-enriched mortar specimens (about 50 mm×about 100 mm; d×h) prepared to different initial levels of liquid water saturation $S_w$ in pores.
Figure 2B:
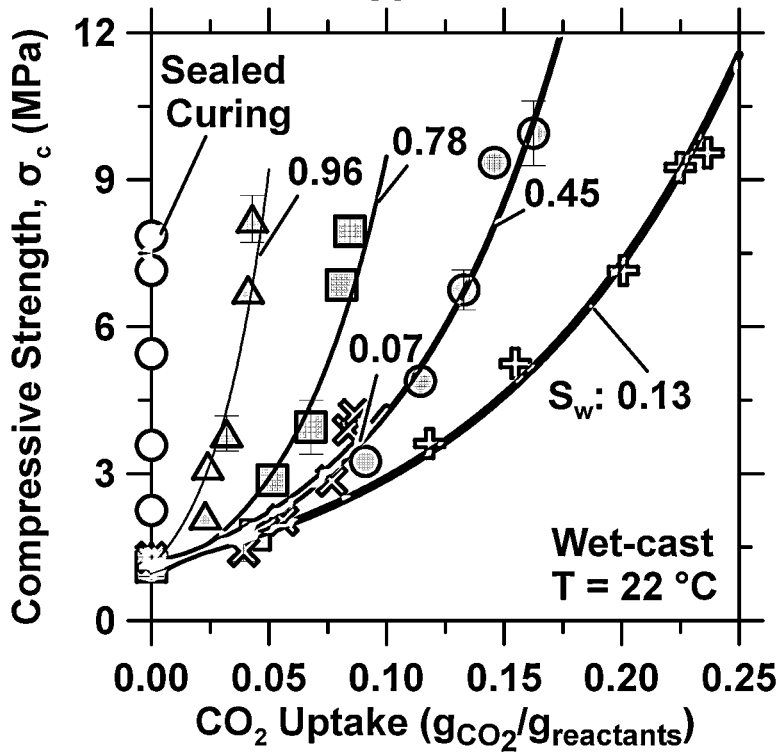
FIG. 2B shows the dependence of compressive strength on $CO_2$ uptake for the same mortars show in FIG. 2A.

Carbonation of Wet-Cast Compositions:

Investigation is made of the carbonation kinetics of mortars containing portlandite-enriched binders in contact with flue gas simulating that from a coal fired power plant (about 12% $CO_2$). A representative binder composition includes about 42 mass % portlandite, about 25 mass % ASTM C618-compliant Class F fly ash (FA), and about 33 mass % OPC. This binder is mixed with fine aggregate (sand) and water to form a mortar. The carbonation kinetics of these mortars is investigated as a function of their initial pore saturation with water ($S_w$), which is controlled by drying prior to carbonation (FIG. 2A). The extent of $CO_2$ uptake achievable within feasible processing durations increases significantly as $S_w$ is reduced, until saturation is reduced below a critical value ($S_{w,c}$). The value of $S_{w,c}$ is between about 0.13 and about 0.07 for wet-cast compositions, indicating that this suppression of $CO_2$ uptake is due to the reduction of water below the intrinsic level for $Ca(OH)_2$ dissolution and carbonation product precipitation. Until this point, carbonation kinetics are hastened by the reduction of pore saturation, and are sufficiently rapid, even in direct exposure to diluted gas streams, to render sufficient $CO_2$ uptake within a feasible processing duration. The strengthening resulting from carbonation (e.g., per unit $CO_2$ uptake) is described in FIG. 2B. Despite their varying $CO_2$ uptake, all compositions demonstrated broadly corresponding compressive strength development, which is comparable or superior to that achieved solely by cement hydration (e.g., sealed curing) by the end of the processing period.

Figure 3A:
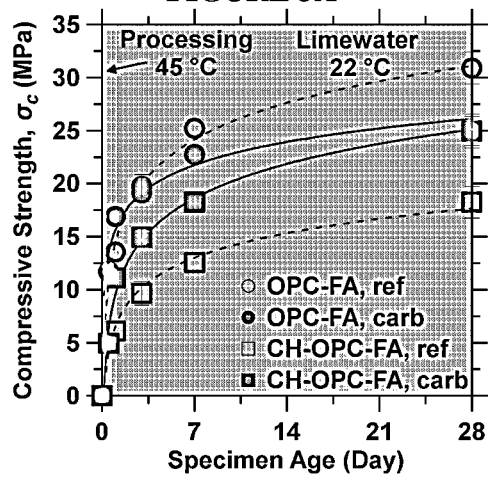
FIG. 3A shows the compressive strength evolution of portlandite-enriched and reference mortars (about 75% portland cement and about 25% Class F fly ash) during carbonation processing and limewater curing.
Figure 3B:
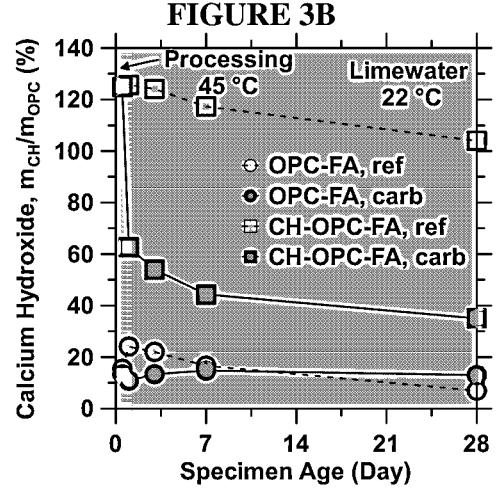
FIG. 3B shows the evolution of calcium hydroxide content.
Figure 3C:
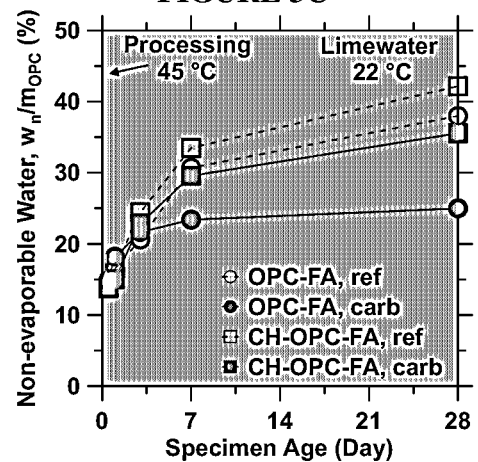
FIG. 3C shows non-evaporable water content of the same specimens. Processing involved either: drying at about 45° C. for about 12 h prior to about 12-h carbonation at about 45° C., or drying at about 45° C. for about 24 h before limewater curing.

Concrete mixtures are typically specified to achieve design compressive strength criteria at an age of 28 days after casting. To evaluate the continued strength development (and progress of hydration and pozzolanic reactions) in carbonated portlandite-enriched binders, mortar specimens are cured in saturated limewater following carbonation, and their compressive strengths are measured (FIG. 3A). As a point of reference, similar evaluations are performed for non-carbonated specimens, and specimens featuring a portlandite-free binder (about 75% OPC and about 25% Class F fly ash). Despite its initially lower strength development, the carbonated portlandite-enriched binder achieved corresponding compressive strength to that of the carbonated mixtures without portlandite, while achieving over about 4× greater $CO_2$ uptake. The continued strength development is attributed to the continued progress of pozzolanic reactions (e.g., between residual calcium hydroxide and silica-rich fly ash) and cement hydration during limewater curing. FIG. 3B displays the mass fraction of calcium hydroxide in each specimen as a function of specimen age, as assessed by thermogravimetric analysis. The initially elevated calcium hydroxide content of the portlandite-enriched binder is rapidly decreased with carbonation, and then shows a continual reduction due to consumption by pozzolanic reactions, at a higher rate than the reference binder. The pozzolanic reaction manifested in the continued development of C-S-H, as indicated by the non-evaporable water ($w_n$) evolution, which was normalized by the OPC mass fraction (FIG. 3C). This figure indicates that carbonated portlandite-enriched binders show a similar evolution of hydrated phases to the non-carbonated reference OPC binders. This trend ensures that unlike the carbonated OPC binder which demonstrates suppressed hydration/pozzolanic reactions in time, carbonated portlandite-enriched compositions continue to gain strength at a higher rate due to formation of hydrated phases.

Figure 4A:
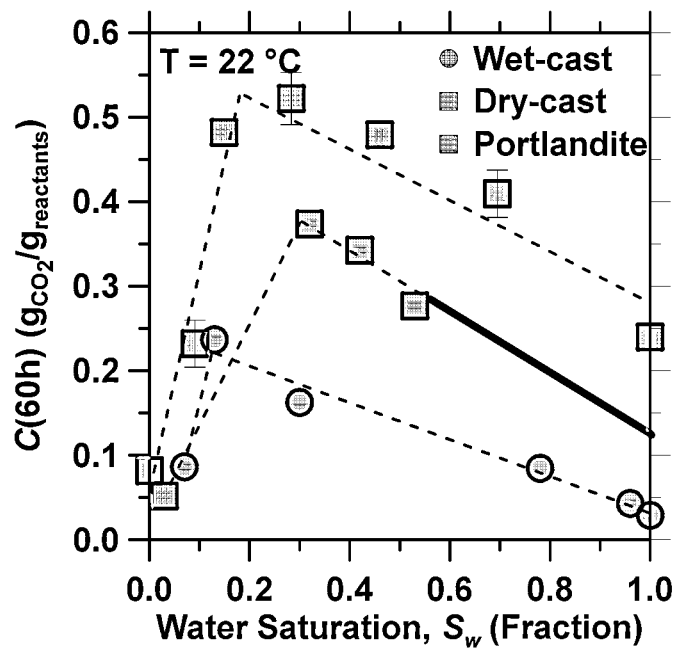
FIG. 4A shows $CO_2$ uptake after 60 h $CO_2$ exposure C(60 h) as a function of initial saturation $S_w$ for wet-cast composites, dry-cast composites, and portlandite compacts. In all cases, reducing $S_w$ enhanced $CO_2$ uptake for $S_w>0.10$. Carbonation occurred in 12% $CO_2$ [v/v] at 22° C.
Figure 4B:
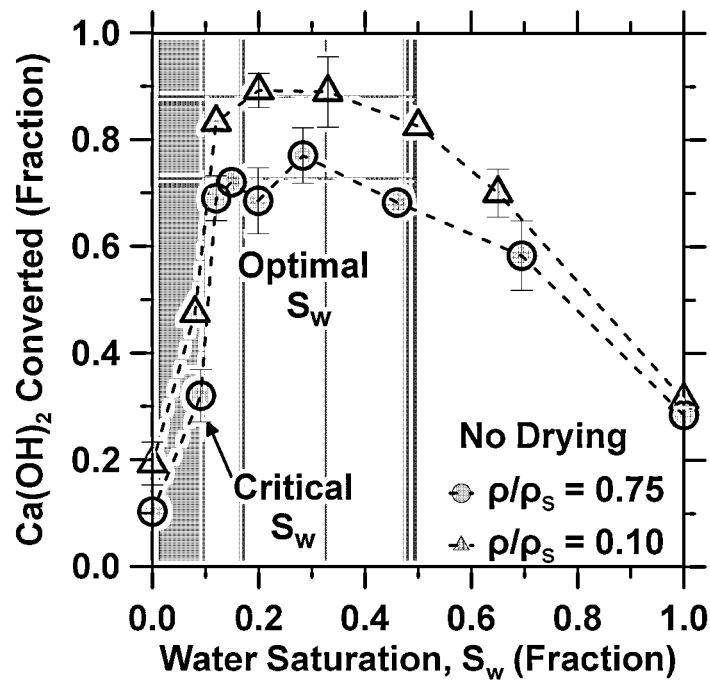
FIG. 4B shows dependence of the 24-h carbonation of dry-cast portlandite pellets on $S_w$ illustrates a similar critical $S_w$, regardless of the pellets' relative density ($\rho/\rho_s$).
Figure 5A:
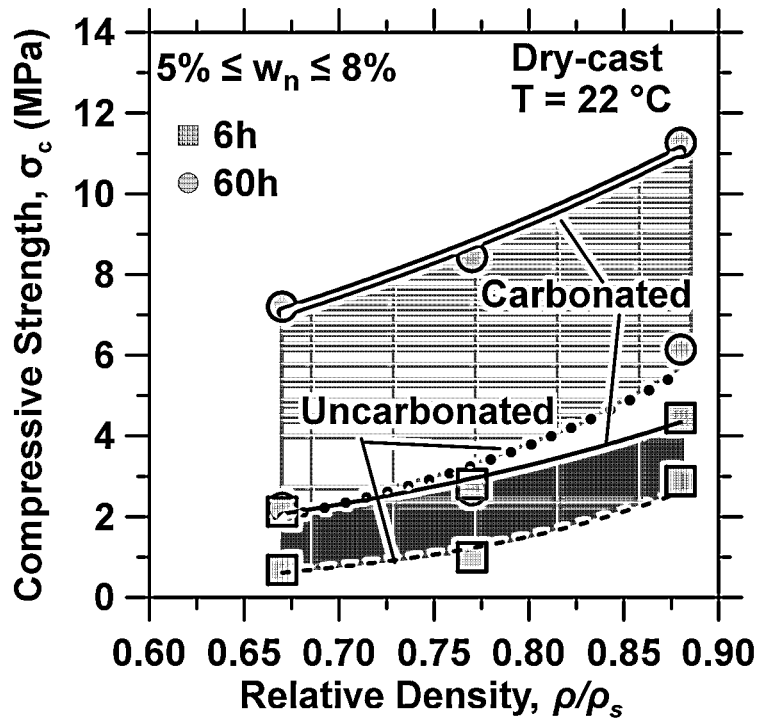
FIG. 5A shows compressive strength of non-carbonated and carbonated (for about 6 or about 60 h) dry-cast mortar specimens as a function of their relative density.

Carbonation of Dry-Cast Compositions:

Mortar formulations containing the same portlandite-enriched binder composition, but with elevated sand content and reduced water content are also developed. Rather than being poured into a mold, these specimens are "dry-cast" into a mold and compacted using a hydraulic press to become shape-stable, as for concrete masonry products. FIG. 4A compares the $CO_2$ uptake of both wet-cast and dry-cast compositions as a function of their saturation. While dry-cast components exhibit higher specific $CO_2$ uptake than wet-cast specimens, both formulations exhibit similar trends with respect to pore saturation. The critical saturation $S_{w,c}$ is similar between the two formulations within the experimental resolution. This trend is also observed in dry-cast pellets composed of solely portlandite (FIG. 4B), indicating that the $S_{w,c}$ reflects the intrinsic sensitivity of $Ca(OH)_2$ carbonation to proximate relative humidity (RH). The strengthening of dry-cast specimens with increasing carbonation durations is illustrated in FIG. 5A, which plots compressive strength as a function of the relative density, a measure of the volume fraction of porosity within the specimens. Carbonation significantly elevates compressive strength relative to non-carbonated samples, and is the dominant contribution to strength development, for all relative densities. At either duration of carbonation, the increase in strength due to carbonation is also approximately constant regardless of the relative density. This finding allows the carbonated strength to be predicted from early age measurements of compressive strength of non-carbonated specimens.

Figure 5B:
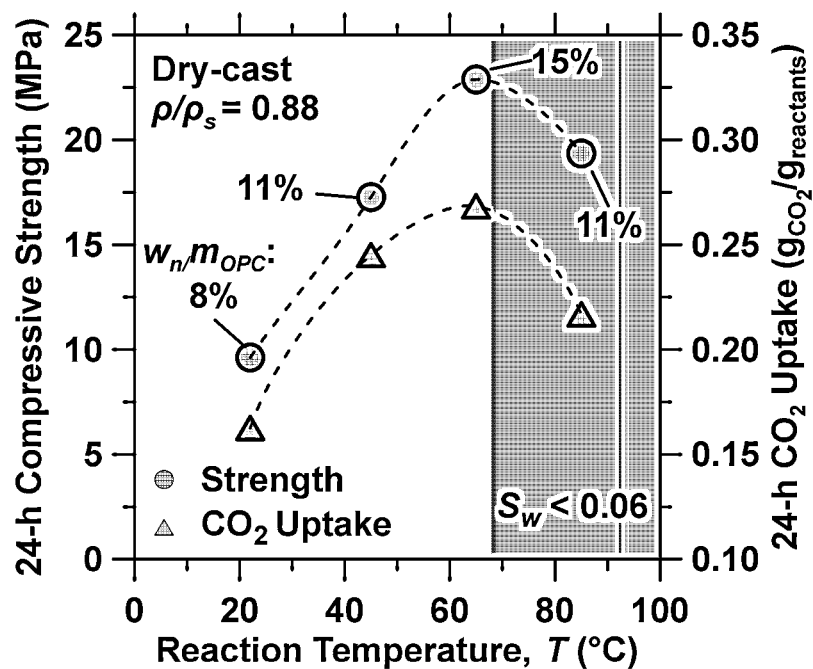
FIG. 5B shows compressive strength (left y-axis) and $CO_2$ uptake (right y-axis) of dry-cast portlandite-enriched mortars following exposure to $CO_2$ (about 12% $CO_2$) at varying reaction temperatures for a range of about 1 h to about 72 h, e.g., about 24 h. Of the temperatures tested, about 65° C. is an optimal temperature for maximizing both $CO_2$ uptake and compressive strength. At higher temperatures, drying during carbonation reduces the liquid water saturation ($S_w$) below the critical value for carbonation of portlandite.

The influences of reaction temperature on the carbonation kinetics and strength development of dry-cast binders are also of note. Given that increasing temperature accelerates both the rate of drying and rate of carbonation, the effects of carbonation temperature on dry-cast mortar specimens are evaluated as a function of the reaction temperature, without drying prior to $CO_2$ exposure (FIG. 5B). Increasing the reaction temperature up to about 65° C. increased both the $CO_2$ uptake and 24-h compressive strength substantially. However, further increasing the temperature to about 85° C. diminished both $CO_2$ uptake and strength gain on account of the insufficient availability of water ($S_w$=0.06 following $CO_2$ exposure at about 85° C. for about 12 h) to support carbonation reactions. This information indicates that carbonation processing may be applied without pre-drying, which allows enhanced process flexibility and increased throughput of $CO_2$ utilization. The critical saturation $S_{w,c}$ observed previously (in cases in which drying did not appreciably reduce the saturation during carbonation) also holds when carbonation processing conditions yield simultaneous drying (saturation reduction).

Figure 6:
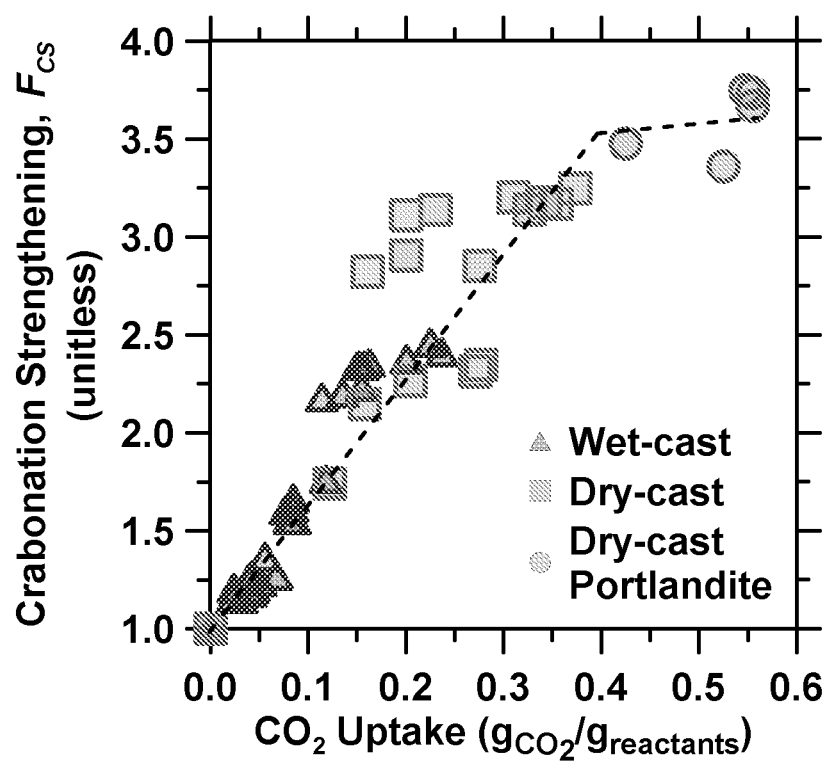
FIG. 6 shows the extent of carbonation strengthening (the ratio between the strength of carbonated and non-carbonated specimens) for wet-cast and dry-cast mortars as a function of their $CO_2$ uptake.

$CO_2$ Uptake—Strength Correlations:

To provide unifying guidelines describing the effect of carbonation on strength development, FIG. 6 shows the carbonation strengthening factor (the ratio between carbonated and non-carbonated specimens) as a function of $CO_2$ uptake. Both wet-cast and dry-cast compositions follow a linear trend of increasing carbonation strengthening with $CO_2$ uptake, up to a value of about 3.75. This allows forecasting of compressive strength development resulting from various compositions and processing, provided that the $CO_2$ uptake is determined. This is important, as the $CO_2$ uptake can be assessed in real-time during carbonation, using on-line instrumentation to quantify reductions in gaseous $CO_2$ concentrations (e.g., nondispersive infrared (NDIR) sensor or gas chromatography).

Figure 7:
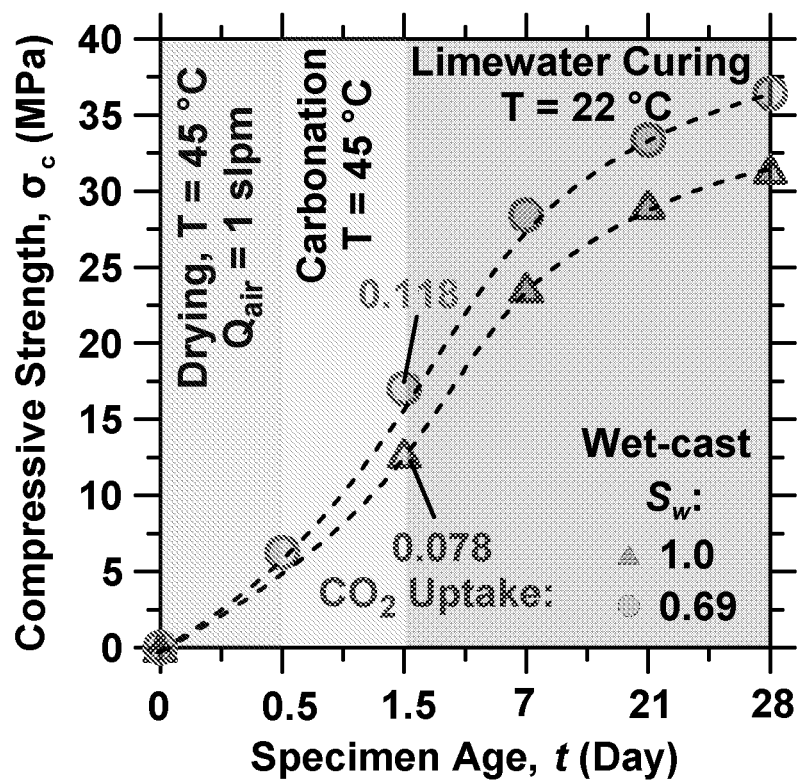
FIG. 7 shows compressive strength evolution as a function of time for two wet-cast mortars, one which was dried at about 45° C. for about 12 h prior to about 24-h carbonation (red circles) and another which was directly carbonated for about 36 h (blue triangles). The wet-cast mortars were composed of: about 35 mass % portlandite, about 15 mass % Class fly ash, and about 50 mass % OPC at water-to-binder ratio (w/b) of about 0.40. Carbonation processing was carried out using about 12% $CO_2$ [v/v].

Fulfillment of Strength Criteria:

Fulfilling design strength criteria (typically 1 day and 28-day strengths) may be achieved via three primary levers: (1) changing the water-to-binder mass ratio (w/b), (2) adjusting the mass proportions of a ternary blend of portlandite-fly ash-OPC in the binder, and (3) altering the processing conditions. A strategy for fulfilling performance criteria (e.g., strength) involves (i) implementing drying prior to carbonation to adjust liquid water saturation in pores, (ii) elevating the temperature used during carbonation processing to simultaneously enhance reaction kinetics and $CO_2$ transport properties (e.g., up to about 65° C.), (iii) reducing the water-to-binder mass ratio (w/b) to reduce volume of porosity, and (iv) increasing OPC content in binder system (e.g., at most ≤about 50 mass % of OPC). As an example in FIG. 7, it is highlighted that processing of a wet-cast mortar by drying at T=about 45° C. for about 12 h resulted in a higher $CO_2$ uptake after carbonation for about 24 h, and also in a greater strength as compared to a similar mortar that was directly carbonated (without an initial drying stage) for a longer duration of about 36 h. After carbonation, the strength continued to increase during limewater curing at which strength on the order of about 35 MPa was produced at 28 days. Furthermore, by comparing strength results between FIG. 3A and FIG. 7, for a similar processing condition, reducing w/b from about 0.45 to about 0.40 and increasing OPC content from about 35% to about 50% enhanced the 28-day strength from about 25 MPa to about 35 MPa. These findings demonstrate that adjustment of processing conditions and mixture proportioning can be implemented to develop carbonate-cemented solids that take up $CO_2$ and provide strengths sufficient to fulfill structural construction criteria (e.g., ≥about 30 MPa as per ACI 318; and ≥about 15 MPa as per ASTM C90 for concrete masonry units), as indicated in FIG. 5B and FIG. 7.

Example

Carbonation Processing and Strength Evolution of Portlandite-Based Cementing Binders

Overview

Binders containing portlandite ($Ca(OH)_2$) can take up carbon dioxide ($CO_2$) from dilute flue gas streams (<15% $CO_2$, v/v) thereby forming carbonate compounds with binding attributes. While the carbonation of portlandite particulates is straightforward, it remains unclear how $CO_2$ transport into monoliths is affected by microstructure and pore moisture content. Therefore, this study elucidates the influences of pore saturation and $CO_2$ diffusivity on the carbonation kinetics and strength evolution of portlandite-enriched composites ("mortars"). To assess the influences of microstructure, composites hydrated to different extents and conditioned to different pore saturation levels ($S_w$) were exposed to dilute $CO_2$. First, reducing saturation increases the gas diffusivity, and carbonation kinetics, so long as saturation exceeds a critical value ($S_{w,c} \approx 0.10$); independent of microstructural attributes. Second, careful analysis reveals that both traditional cement hydration and carbonation offer similar levels of strengthening, the magnitude of which can be estimated from the extent of each reaction. As a result, portlandite-enriched binders offer cementation performance that is similar to traditional materials while offering an embodied $CO_2$ footprint that is more than 50% smaller. These insights are foundational to create new "low-$CO_2$" cementation agents via in situ $CO_2$ mineralization (utilization) using dilute $CO_2$ waste streams.

Cementation enabled by in situ carbonation is a promising alternative to conventional concrete that relies upon the reaction of $CO_2$ with alkaline inorganic precursors to precipitate carbonate solids. In this method, a shape-stabilized green body (e.g., block, slab, beam) is exposed to $CO_2$, e.g., in the gas, liquid, or supercritical states, which may be sourced from $CO_2$ waste streams. Here, green bodies may be produced by either wet-casting (wherein a slurry is poured into a mold until it hardens and becomes self-supporting) or dry-casting (in which components having very low water contents are mechanically compacted until they are self-supporting). In the absence of water, the carbonation of mineral reactants such as portlandite ($Ca(OH)_2$) may proceed via gas-solid reaction. However, faster rates and greater extents of portlandite conversion and $CO_2$ mineralization are realized when the presence of liquid water promotes a dissolution-precipitation mechanism of carbonation, which entails the following steps for green bodies composed of calcium-bearing reactants:

The dissolution of the reactants releases $Ca^{2+}$ species within the pore liquid, The dissolution and transport of $CO_2$ (i.e., as a gas/vapor or dissolved carbonate ions) occurs from the outside environment through the green body's pore network, and, The reaction of dissolved species precipitates carbonate minerals (e.g., $CaCO_3$).

The embodied $CO_2$ intensity of the resulting carbonated binder may be substantially reduced vis-à-vis OPC depending on the nature of reactants used. This is attributed to: (i) the direct sequestration of $CO_2$ from an emissions stream which fulfills the premise of $CO_2$ utilization, and (ii) the $CO_2$ avoidance associated with the substitution of OPC by industrial wastes (e.g., coal fly ash) or alkaline solids that may be produced by a low-temperature pathway, e.g., portlandite.

In green bodies composed using readily-dissolving reactants such as portlandite, $CO_2$ transport through the body is often the rate limiting step in carbonation. In the absence of significant pressure gradients, $CO_2$ transport is dominated by diffusion. As the diffusivity of dissolved $CO_2$ through water is $\approx 10^4$ times lower than that of gaseous $CO_2$ in air, the provision of air-filled porosity within green bodies is critical to accelerating the rate of carbonation. The effective diffusivity of partially saturated pore networks is inversely proportional to the microstructural resistance factor $f(S_w, \phi)$. The microstructural resistance to diffusion increases as the total porosity, $\phi$, is reduced and as the volume fraction of porosity that is saturated with liquid water, $S_w$, is increased. The total porosity of portlandite-enriched composites is a function of their composition (e.g., water-to-binder mass ratio, aggregate content), method of forming (e.g., wet-cast vs. dry-cast, and degree of consolidation), and the extent of hydration and carbonation reactions that may have occurred. On the other hand, $S_w$ can be reduced by using dry-cast mixtures with low water contents, or by drying before (or during) $CO_2$ exposure. However, large reductions in $S_w$ may depress the internal relative humidity (RH) within the green body's pores; a relationship which is described by the material's water vapor sorption isotherms. This is significant, as the RH of the $CO_2$-containing gas stream ("reaction environment") that is contacting portlandite has been noted to significantly impact its carbonation behavior. For example, portlandite's carbonation in dry conditions (RH$\approx$0%) is hindered (e.g., less than 10% conversion), due to surface passivation associated with gas-solid carbonation. Increasing the RH is noted to promote a dissolution-precipitation pathway, which enables near complete conversion (e.g., in excess of 80%). Although the important of the reaction environment's RH on the carbonation of portlandite particulates is recognized, the effect of pore saturation on the carbonation of portlandite-based monoliths remains unclear.

The fabrication of carbonated wet-cast or dry-cast structural concrete components that fulfill specific engineering performance criteria requires a detailed understanding of the mechanisms of cementation (strengthening) therein. Although it is known that the products of carbonation, OPC hydration, and pozzolanic reactions can adhere proximate surfaces and induce reductions in porosity, the contributions of these reactions to strength gain, especially in carbonated composites, remain unclear. For example, during $CO_2$ exposure, these reactions occur concurrently, making it difficult to isolate the contributions of each reaction to strength gain. Furthermore, C-S-H precipitation on reactant surfaces and within pore spaces, prior to carbonation, may limit strengthening by hindering $CO_2$ diffusion and reducing the availability of exposed reactant (portlandite) surfaces. Finally, it is unknown whether conventional relationships between the extent of hydration and strength hold true during $CO_2$ exposure, as processing conditions that may favor carbonation (e.g., decreasing $S_w$ by drying) may suppress OPC hydration and pozzolanic reactions due to the consumption of portlandite. To overcome gaps in knowledge to implement carbonation-based cementation, this example primarily aims to elucidate the influences of microstructure on the carbonation kinetics of portlandite-enriched cementing composites ("mortars"). The premise of using portlandite is straightforward for a multiplicity of reasons including:

Making use of existing facilities: Portlandite can be produced using limestone as a precursor using existing OPC kilns and features a cost that is essentially similar to OPC, Lower processing temperature: Portlandite's production, by the decarbonation of limestone around 800° C. (at ambient pressure, in air), followed by the hydration of lime requires a processing temperature that is nearly 700° C. lower than OPC production, Straightforward carbonation: Unlike OPC and other potential alkaline precursors, portlandite carbonation is only slightly affected by temperature and $CO_2$ partial pressure for conditions relevant to flue gas exposure (≈4-15% $CO_2$, v/v), provided that the RH of the contacting gas is sufficient to promote liquid water-mediated carbonation, and, Highest $CO_2$ uptake: Due to its substantial calcium content, portlandite features among the highest potential $CO_2$ uptake (59 mass %) of mineral reactants that may be achieved in contact with flue gases. For example, although $Mg(OH)_2$ has a higher potential $CO_2$ uptake (75 mass %), it requires a greatly elevated temperature and pressure to achieve similar carbonation kinetics (rates) as portlandite.

Taken together, the findings highlight that portlandite-enriched binders can serve as a viable functional replacement for OPC-based cementation agents, and offer new insights to design concrete construction components that are cemented via in situ $CO_2$ mineralization.

Materials and Methods:

Materials and Sample Preparation

Portlandite-enriched binders were composed of: 42 mass % portlandite, 33 mass % ASTM C150-compliant ordinary portland cement (Type II/V OPC) and 25 mass % ASTM C618-compliant Class F fly ash (FA). OPC was incorporated to provide green strength and to facilitate handling prior to drying and carbonation, whereas FA served as a source of aluminosilicates to promote pozzolanic reactions. A portlandite-free reference binder (i.e., 75 mass % OPC and 25 mass % FA) was also formulated to isolate portlandite's influences on reactions and strength evolution. The portlandite (Mississippi Lime) used featured a purity of 94%±2% (by mass) with the remainder being composed of $CaCO_3$ as determined by thermogravimetric analysis (TGA). The median particle diameters ($d_{50}$) of portlandite, FA, and OPC were 3.8 μm, 8.9 μm, and 17.2 μm, respectively, as determined using static light scattering (SLS; LS13-320, Beckman Coulter). Further details on the chemical composition and particle size distributions of binder solids are reported in the Supporting Information (SI).

The binders were combined with ASTM C33 compliant silica sand (fine aggregate) to form composites ("mortars") as described in ASTM C305. Wet-cast composites were formulated at w/b=0.45 (w/b=water-to-binder mass ratio) and a/b=3.5 (a/b=aggregate-to-binder mass ratio). Dry-cast composites had w/b=0.25 and a/b=7.95. The fine aggregate had a density of 2650 kg/m³ and a water absorption of ≤1.0 mass %. A commercially-available polycarboxylate ether (PCE) dispersant was added to enhance the fluidity of the wet-cast composites at a dosage of 0.8% of the binder mass. The wet-cast composites were molded into cylinders (50 mm×100 mm; d×h) and vibrated to remove entrapped air. Dry-cast composites were prepared by compaction using a hydraulic press to form cylindrical specimens (75 mm×40 mm; d×h) that featured a surface area-to-volume ratio (SA/V, $mm^{-1}$) equivalent to the wet-cast specimens. The compaction pressure was varied between 0.5 MPa and 22.0 MPa to achieve relative densities ($\rho/\rho_s$, the ratio of bulk density to skeletal density) ranging between 0.58-to-0.88. Dry-cast portlandite composites with w/b=0.25 and a/b=7.95 as well as neat portlandite pellets (10 mm×8 mm; d×h) with different water-to-solid (i.e., portlandite) mass ratios between 0 and 0.75 were also formed by compaction for comparative analyses.

Drying and Carbonation Processing

The wet-cast composites were cured under sealed conditions for 6 h at T=22±2° C. to achieve shape stability and a compressive strength $\sigma_c$≈0.5 MPa. The specimens were then either carbonated immediately after forming or dried under exposure to flowing air to achieve different initial $S_w$ prior to carbonation. In contrast to the wet-cast composites, the initial $S_w$ of the dry-cast composites was altered by applying different compaction pressures. During drying and carbonation, the cylindrical specimens were placed in custom-built reactors with an internal diameter of 100 mm and a length of 150 mm (see schematic, FIG. 14 in SI). The reactors were placed in an oven for temperature regulation and the flow rate of the inlet gas was controlled by mass-flow controllers. Different drying conditions were implemented by varying the: (i) air temperature (22±0.5° C., 45±0.5° C., and 65±0.5° C.), (ii) air flow rate (0.5 slpm to 40 slpm; standard liters per minute), and, (iii) drying duration (0 to 12 h). Carbonation during air drying was very limited. The average $CO_2$ uptake of wet-cast specimens prior to $CO_2$ exposure was 0.015±0.005 $g_{CO2}/g_{reactants}$. The dried specimens were then contacted with simulated flue gas at a flow rate of 0.5 slpm for up to 60 h at different isothermal temperatures (22±0.5° C., 45±0.5° C., and 65±0.5° C.). The simulated flue gas was prepared by mixing air and $CO_2$ to mimic the exhaust of a coal power plant. The $CO_2$ concentration of the gas was 12±0.2% [v/v] as confirmed using gas chromatography (GC; F0818, Inficon).

Experimental Methods

Time-dependent $CO_2$ uptake was quantified using thermogravimetric analysis (TGA: STA 6000, Perkin Elmer). The values reported are the average $CO_2$ uptake of three powdered samples taken along the height of the cylindrical specimens. Around 30 mg of each powder was placed in pure aluminum oxide crucibles and heated at a rate of 15° C./min over a temperature range of 35° C. to 975° C. under UHP-$N_2$ gas purge at a flow rate of 20 mL/min. The $CO_2$ uptake was quantified as the mass loss associated with $CaCO_3$ decomposition over the temperature range of 550° C. to 900° C., normalized by the total mass of solids in the binder (i.e., portlandite, fly ash, and OPC). Towards this end, the mass loss associated with $CaCO_3$ was initially normalized by the total sample mass (i.e., aggregate+binder solids) in the form of $g_{CO2}/g_{solid}$. The results were then normalized by the fraction of binder present in the total solids (i.e., $g_{CO2}/g_{solid}*g_{solid}/g_{reactants}=g_{CO2}/g_{reactants}$), which was determined from the mixture proportions. It should be noted that the initial $CO_2$ content (i.e., carbonate minerals within the aggregates and binder) and the $CO_2$ uptake during drying were subtracted from the overall $CO_2$ uptake measured during carbonation, to eliminate their influences on the experimental results. The non-evaporable water content ($w_n$, mass %) was calculated as the mass loss over the temperature range of 105° C. to 975° C. excluding the mass loss from the decomposition of $CaCO_3$ and $Ca(OH)_2$.

The compressive strength of the composites was measured as per ASTM C39. Appropriate strength correction factors were applied in consideration of the specimens' length-to-diameter ratios to allow direct comparisons between the dry-cast and wet-cast specimens, which feature slightly different geometries.

The total porosity and pore (moisture) saturation level of the composites before and after carbonation were quantified using a vacuum saturation method. Cross-sectional disks, 25 mm-thick were sectioned from the middle of the cylindrical specimens using a low-speed saw. Isopropanol (IPA) was used as the solvent to arrest hydration. The $CO_2$ diffusivity was estimated from the total moisture diffusion coefficient, $D_{tot}$ (m$^2$/s), (i.e., the sum of liquid water and water vapor diffusion coefficients) of the composites prior to $CO_2$ exposure using Fick's $2^{nd}$ law of diffusion, as elaborated in the SI.

Results

Influences of Saturation on $CO_2$ Uptake in Portlandite-Enriched Binders

Figure 8A:
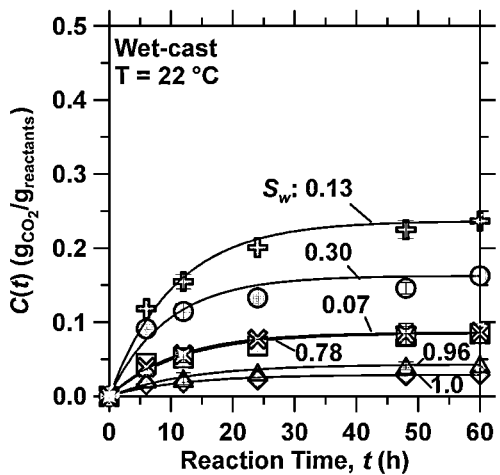
FIG. 8A shows time-dependent $CO_2$ uptake within wet-cast composites and FIG. 8B shows time-dependent $CO_2$ uptake within dry-cast composites at varying initial saturation $S_w$. The data was fit by an equation of the form $C(t)=C(t_u)[1-\exp((-kt)/C(t_u))]$ to estimate the apparent carbonation rate constant $k(h^{-1})$.
Figure 8B:
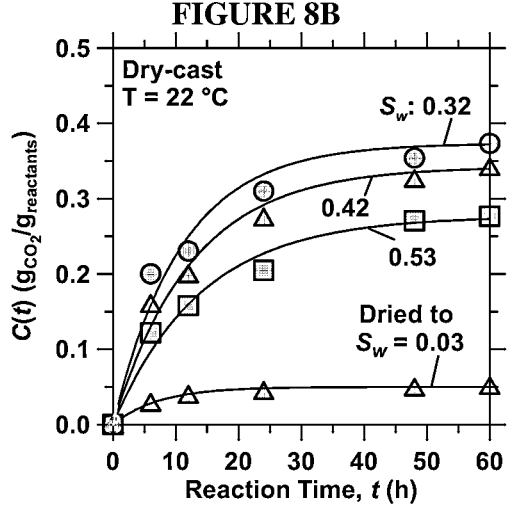

The carbonation kinetics of wet-cast composites pre-dried to different initial $S_w$ (FIG. 15 in SI) were evaluated. FIG. 8A displays the time-dependent $CO_2$ uptake of each specimen C(t) normalized by the mass of reactants, i.e., portlandite, fly ash, and OPC. The measured data was fitted to an equation of the form C(t)=C ($t_u$) [1−exp ((−kt)/C($t_u$))] to estimate the apparent carbonation rate constant (k, h$^{-1}$), and C($t_u$), the ultimate $CO_2$ uptake, where $t_u$ is taken as 60 h. Reducing $S_w$ from 1.00 (complete saturation) to 0.13 for the wet-cast composites increased both the carbonation rate constant and the ultimate $CO_2$ uptake by nearly 10× (FIG. 8A). The same observation is true for dry-cast composites, demonstrating the significance of $S_w$ as a controlling variable on carbonation kinetics across different forming methods and microstructures. But, enhanced levels of $CO_2$ uptake were obtained for the dry-cast relative to wet-cast composites at comparable $S_w$ (FIG. 8B), as further discussed below.

Figure 8C:
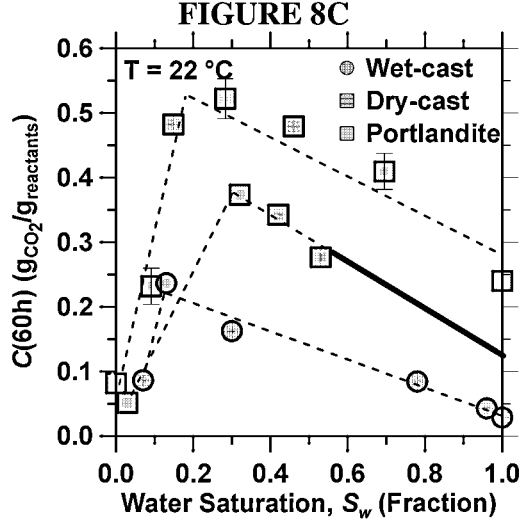
FIG. 8C shows the $CO_2$ uptake after 60 h $CO_2$ exposure C(60 h) as a function of initial saturation $S_w$ for wet-cast composites, dry-cast composites, and portlandite compacts. In all cases, reducing $S_w$ enhanced $CO_2$ uptake for $S_w>0.10$. Carbonation occurred in 12% $CO_2$ [v/v] at 22° C.

The carbonation of both the wet-cast composites and neat portlandite compacts was nearly fully suppressed when $S_w$ was reduced below a critical value, $S_{w,c} \approx 0.10$ (FIG. 8C). It should be clarified that although the trend fitted to the data for dry-cast composites indicates a higher critical saturation $S_{w,c}=0.30$ (identified as $S_w$ at which there is a maximum in $CO_2$ uptake), this estimation resulted from a lack of data corresponding to dry-cast composites within $0.03<S_w<0.30$. However, separate data obtained for the neat portlandite compacts (FIG. 8C) indicated a critical saturation level, $S_{w,c}=0.14$. This value is similar to $S_{w,c}=0.12$ that was determined for the wet-cast composites (FIG. 8C). This implies that $S_{w,c} \approx 0.10$ is an intrinsic limit on portlandite carbonation, which is sustained for composites prepared by both wet-cast and dry-cast forming methods. Assuming that the water vapor sorption isotherms of portlandite-enriched binders are functionally similar to those of typical cementitious binders, $S_{w,c} \approx 0.10$ corresponds to an internal RH≈10%. These findings broadly agree with the minimum ambient $RH_c=8\%$ to promote carbonation reactions via a dissolution-precipitation pathway. So long as $S_{w,c}$ is exceeded, $Ca^{2+}$ species liberated following the dissolution of portlandite and other Ca-bearing reactants (OPC and fly ash) react with dissolved $CO_2$ species (i.e., $CO_3^{2-}$ and $HCO_3^-$) to precipitate calcium carbonate. However, below $S_{w,c}$, carbonation may be hindered by the reduced mobility and availability of water to support dissolution and precipitation; thus, carbonation should, in some embodiments, proceed by gas-solid reaction, which is limited by surface passivation. This observation suggests that carbonation suppression at low $S_w$ may result from a shift in the reaction mechanism, which is applicable across processing and preparation conditions. Therefore, maintaining $S_w > S_{w,c}$ is an important requirement in some aspects for the carbonation of portlandite-enriched binders to enhance $CO_2$ uptake and the carbonation strengthening. A detailed analysis of the TGA traces of portlandite-enriched composites indicated that $Ca(OH)_2$ was rapidly converted upon $CO_2$ exposure, and accounted for nearly all of the overall $CO_2$ uptake within the first 10 h $CO_2$ exposure. As portlandite conversion slowed, the contribution of other solid such as C-S-H became significant. These results suggest that the overall carbonation rate largely corresponded to that of portlandite carbonation initially, with a progressive switchover, in time, to the carbonation of other solid phases which including C-S-H. The contributions of other solid phases to the total $CO_2$ uptake of binder for the wet- and dry-cast composites ranged between 2%-15% and 20%-38%, respectively, after 60 h $CO_2$ exposure. These results indicate that the overall $CO_2$ uptake of portlandite-enriched composites is largely dominated by portlandite carbonation.

Figure 9A:
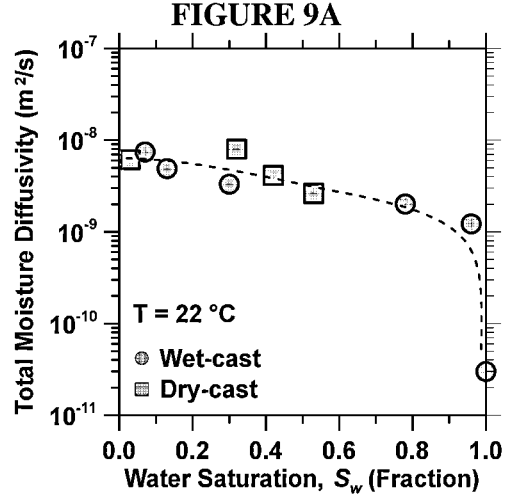
FIG. 9A shows total moisture diffusivity of dry-cast/wet-cast composites as a function of their initial saturation $S_w$. The dashed line is a guide for the eye.
Figure 9B:
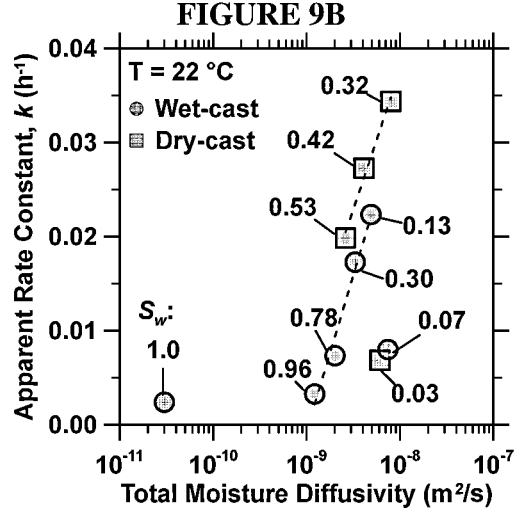
FIG. 9B shows apparent carbonation rate constant as a function of the total moisture diffusivity across dry-cast and wet-cast composites.
Figure 9C:
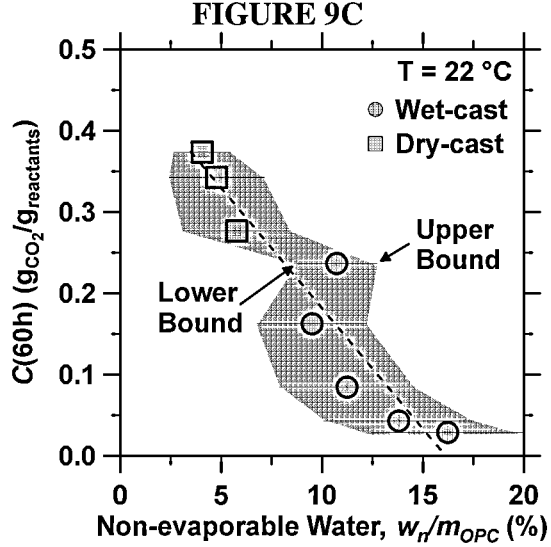

The differences in the carbonation kinetics between wet-cast and dry-cast composites are on account of the composites' microstructural resistances to $CO_2$ diffusion. Here, the $CO_2$ diffusivity was indirectly estimated by the total moisture diffusivity, which was measured by one-dimensional drying experiments. Although the mechanisms by which $CO_2$ and moisture (i.e., in the form of liquid and vapor phases) diffuse through pore networks may somewhat differ, they are both controlled by the total porosity, tortuosity and saturation level of the pore structure. The total moisture diffusivities of the composites were estimated at the time immediately prior to the initiation of carbonation. At equivalent $S_w$, the dry-cast composites showed a higher moisture diffusivity than wet-cast composites, due to their lower degree of OPC hydration (FIG. 9A). This reinforces the premise that microstructural resistance controls $CO_2$ diffusion and carbonation reaction kinetics. The carbonation rate constant of wet-cast and dry-cast composites at varying $S_w$ shows a similar logarithmic scaling as a function of the total moisture diffusivity for $S_w \geq 0.13$ (FIG. 9B). It should be noted, however, that the dry-cast composites showed rate constants that are systematically higher than those of wet-cast composites for equivalent diffusivities. This difference is postulated to result from the different extents of OPC hydration of the two composites, as reflected in their non-evaporable water contents (FIG. 9C). Indeed, the $CO_2$ uptake of both wet-cast and dry-cast composites decreased at a similar rate with increasing non-evaporable water content. The enhanced carbonation kinetics of the dry-cast composites is therefore consistent with the elevated accessibility of portlandite surfaces therein, due to such surfaces being less occluded by C-S-H precipitates which may impose transport barriers to $CO_2$ contact and intrusion. This indicates that if OPC hydration in wet-cast composites was limited to a degree similar to that of the dry-cast composites (while ensuring shape stability) they too may feature enhanced $CO_2$ uptake.

Carbonation Strengthening of Portlandite-Enriched Binders

Figure 10A:
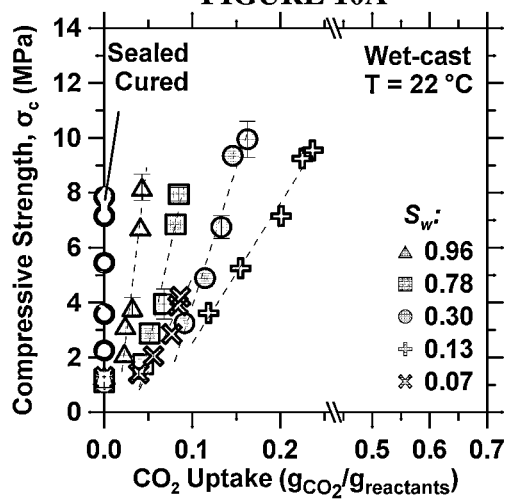
FIG. 10A shows the evolution of compressive strength as a function of $CO_2$ uptake for wet-cast composites at varying initial saturation levels induced by drying and FIG. 10B shows the evolution of compressive strength as a function of $CO_2$ uptake for dry-cast composites at varying initial saturation levels induced by compaction pressure. The dependence of the slope of FIG. 10C the strength per unit $CO_2$ uptake as a function of the change in non-evaporable water content ($\Delta(w_n/m_{OPC})$) during $CO_2$ exposure, and FIG. 10D the strength per fraction of OPC hydration $w_n/m_{OPC}$ as a function of the $CO_2$ uptake during $CO_2$ exposure for dry-cast and wet-cast composites. Extrapolation of these trends was used to assess the independent contributions of hydration or carbonation. In all cases, carbonation was carried out using 12% $CO_2$ [v/v] at 22° C.
Figure 10B:
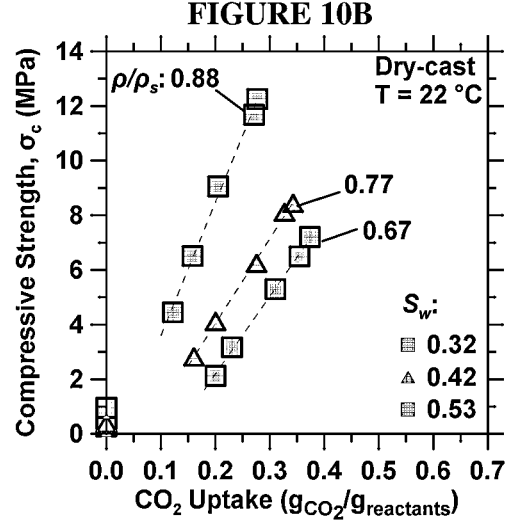
Figure 16:
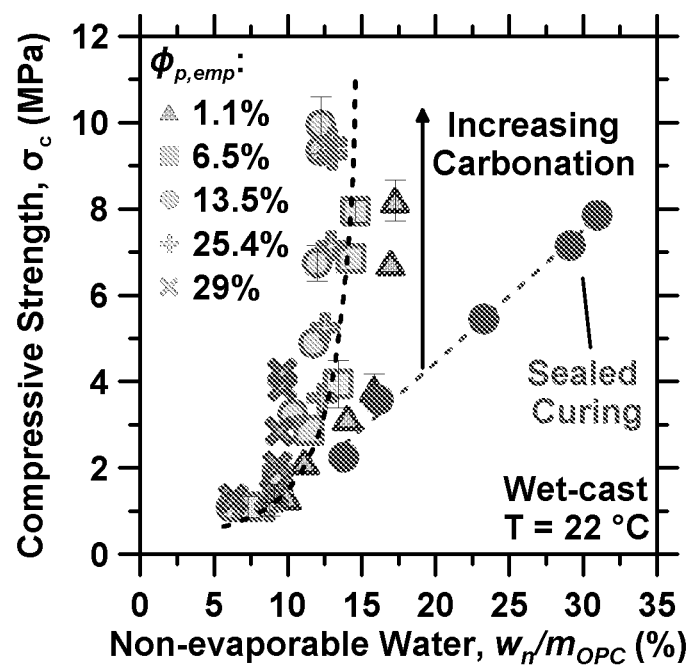
FIG. 16 shows a correlation between compressive strength development and non-evaporable water content for wet-cast composites across increasing carbonation duration.

The compressive strengths of the portlandite-enriched composites increased over the course of $CO_2$ exposure due to carbonation and OPC hydration (FIG. 10A). Notably, despite their lower extents of OPC hydration (i.e., $w_n/m_{OPC}$), the carbonated composites featured strengths equivalent to or greater than that of a sealed composite, i.e., in which OPC was permitted to hydrate without $CO_2$ exposure. Strength slightly increased as the initial $S_w$ was reduced, owing to the increased $CO_2$ uptake (FIG. 16 in SI). However this was so only as long as $S_w > S_{w,c}$, because, in general, both carbonation and hydration are suppressed at low internal RH. The critical pore saturation required to sustain OPC hydration is substantially higher than that of carbonation reactions. For instance, the hydration of alite ($Ca_3SiO_5$, the major phase in OPC) is suppressed when the internal RH drops below 80%. The dry-cast composites showed a contrasting trend, whereby strength increased with $S_w$ (FIG. 10bB). However, this is, in part an artifact resulting from the reduction in total porosity that resulted from the increased levels of compaction that were used to elevate $S_w$. For example, analytical analysis of particle packing within the dry-cast composites reveals a 4× reduction in the interparticle spacing as the relative density increased from 0.67 to 0.88. Not only does this improve particle-to-particle contacts, but it also permits more effective cohesion in the material by a smaller quantity of cementing agent (carbonate precipitates).

Figure 10C:
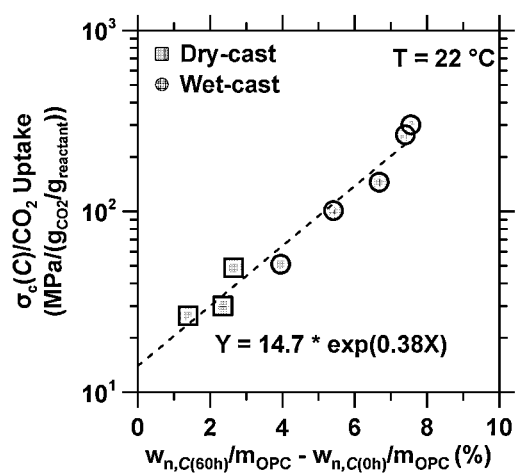
Figure 10D:
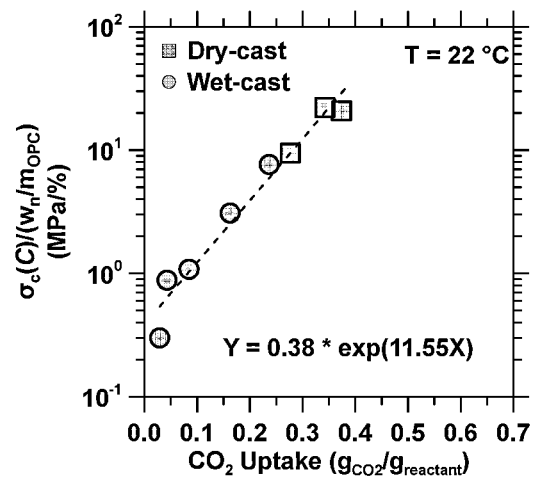

Unlike carbonated pastes composed only of fly ash, the strength-$CO_2$ uptake curves of portlandite-enriched composites with different initial $S_w$ cannot all be fitted by a single linear relation, i.e., with a shared slope $m=\Delta\sigma_c/\Delta C$; MPa/ ($g_{CO2}/g_{reactant}$) that remains constant over the course of carbonation (see FIG. 10). Rather, both wet-cast and dry-cast composites demonstrated unique bi-linear trends wherein the secondary slope $m_2$ (i.e., between t=6 h and t=60 h) was steeper than the initial slope $m_1$ (i.e., between t=0 h and t=6 h); i.e., indicating an increase in the strength gain per unit $CO_2$ uptake at later ages after the cementing agent first cohered the solid skeleton together. Interestingly, the later-age slope $m_2$ increased exponentially with the normalized non-evaporable water content $\Delta(w_n/m_{OPC})$ and eventually sketched a single curve for both wet-cast and dry cast mixtures (FIG. 10C). As such, extrapolation to $\Delta(w_n/m_{OPC})=0$ (i.e., when the OPC would remain unreacted during $CO_2$ exposure) yields a y-intercept of 14.7 MPa per unit mass $CO_2$ uptake ($g_{CO2}/g_{reactants}$). This value reflects the strength gain per unit mass of $CO_2$ uptake in the portlandite-enriched binder in the absence of concurrent strengthening by OPC hydration. This level of strengthening is substantially higher than the 3.2 MPa per unit mass of $CO_2$ uptake noted for fly ash reactants ($g_{CO2}/g_{fly\ ash}$)—an unsurprising outcome given the much higher mobility and availability of Ca-species and greater carbonation reaction rate provisioned by portlandite. Similar analysis of the strength-$w_n/m_{OPC}$ relation over the course of $CO_2$ exposure (FIG. 10D) indicates that OPC hydration results in strength gain of ≈0.38 MPa per unit of OPC reacted ($w_n/m_{OPC}$). As such, assuming that the binding effects of carbonation and OPC hydration are additive, for processing carried out at 22° C., strength developed can be estimated by an equation of the form $\sigma_c(t)=A\cdot C(t)+B\cdot w_n(t)/m_{OPC}$ where A=14.7 MPa/ ($g_{CO2}/g_{reactants}$) and B=0.38 MPa/($w_n/m_{OPC}$) as determined from the slopes of the strength-$CO_2$ uptake and strength-$w_n/m_{OPC}$ curves.

Figure 17:
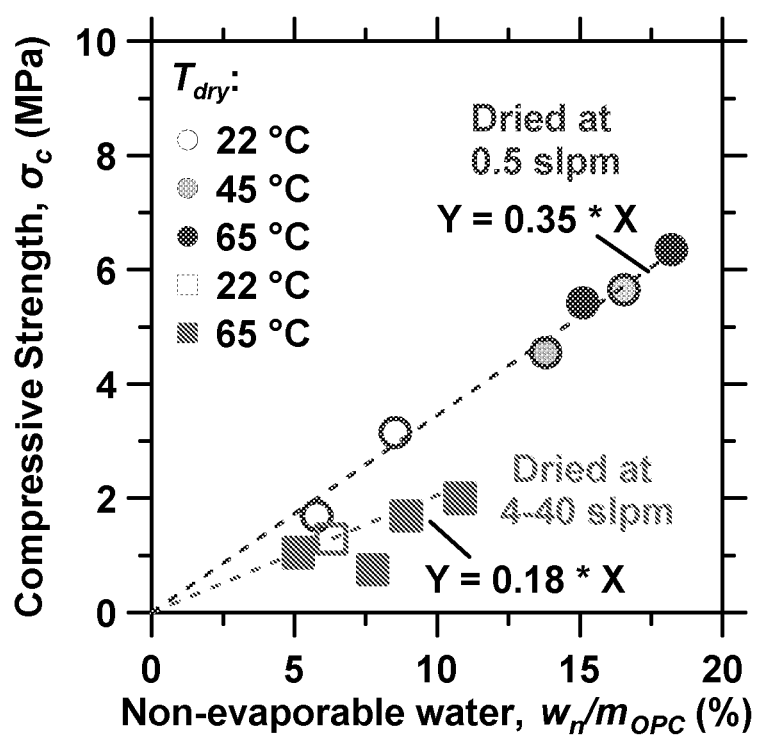
FIG. 17 shows a dependence of the compressive strength on $w_n/m_{OPC}$ during drying before $CO_2$ exposure across diverse drying conditions.

Note, the strength gain per degree of OPC hydration estimated above is similar to that observed during sealed curing in the absence of $CO_2$ exposure (FIG. 16 in SI) and to that within portlandite-free composites, indicating that carbonation, and the presence of portlandite as a reactant does not explicitly induce a change in the composition (i.e., Ca/Si, molar ratio) or binding performance of the reaction products that are formed. It should be noted however, that the strength prediction equation noted above offers better estimates for the dry-cast, as opposed to the wet-cast composites. This is on account of the effects of drying (FIG. 17 in SI). For example, unlike drying at a low flow rate of 0.5 slpm (i.e., similar to that used for carbonation), increasing the flow rate to enhance drying depressed the rate of strength gain per degree of OPC hydration. This may be attributed to the effects of microcracking, and/or heterogeneity in microstructure with respect to the nature of hydration products that may form resulting from the accelerated extraction of water, especially at higher temperatures. Due to the inherently lower water content of the dry-cast composites, and the reduced extent of OPC hydration that results—dry-cast composites are therefore less affected by processing conditions prior to carbonation.

Figure 11A:
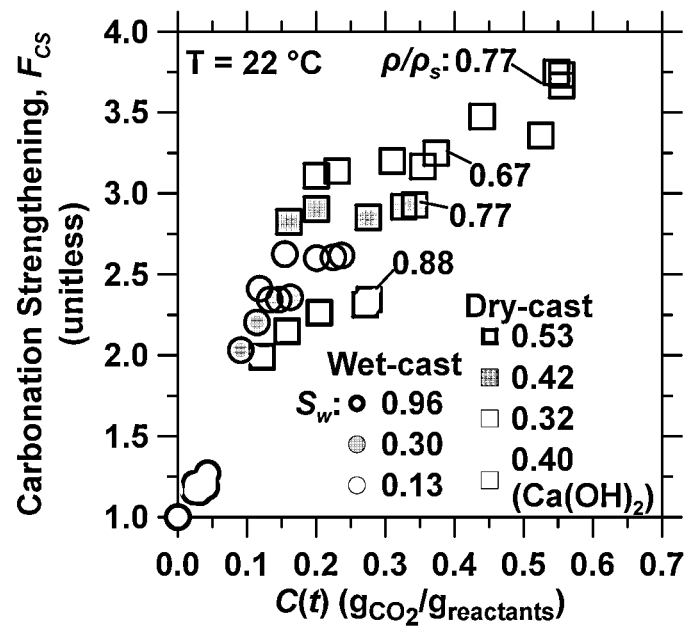
FIG. 11A shows carbonation strengthening factor as a function of the ultimate $CO_2$ uptake for wet-cast and dry-cast composites.

Nevertheless, analysis of the carbonation strengthening factor ($F_{cs}$, unitless), i.e., the ratio of the strength of carbonated to non-carbonated composites revealed that dry-cast composites composed of neat-portlandite achieved $F_{cs}$=3.75 (FIG. 11A). This was substantially higher than the strengthening factors achieved for wet-cast composites ($F_{cs}$≤2.5) and dry-cast composites ($F_{cs}$≤3.25)—and confirms that the strengthening offered by the in situ formation of carbonates is foundational in ensuring cohesion and strength development (FIG. 18 in SI). Interestingly, $F_{cs}$ of dry-cast mixtures was inversely correlated to their relative density ($\rho/\rho_s$) indicating that the strengthening effect arising from compaction/particle interlock reduces the relative influence of carbonation and the bridging action of cementing precipitates.

Figure 11B:
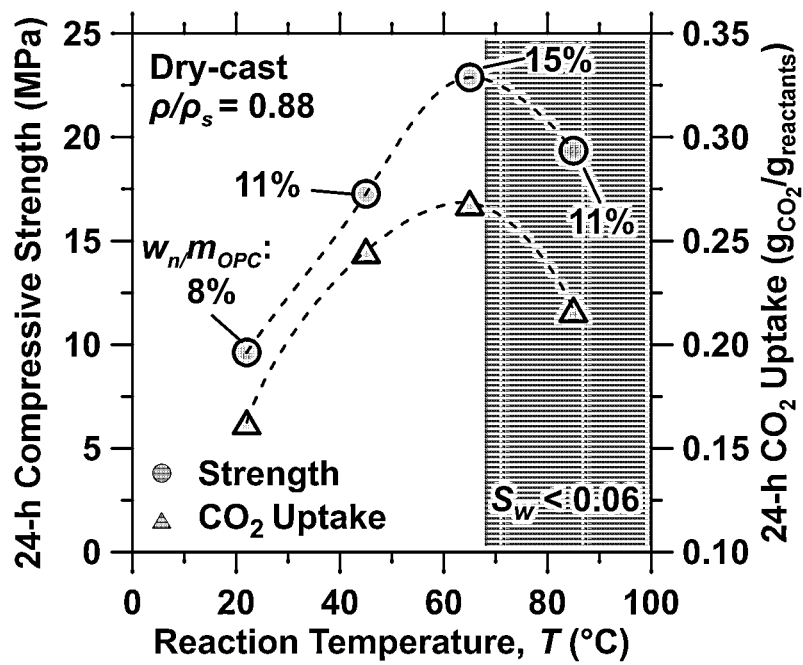
FIG. 11B shows the evolution of 24-h compressive strength and $CO_2$ uptake as a function of the reaction temperature for dry-cast composites. Herein, carbonation was carried out using 12% $CO_2$ [v/v].

$S_w$, can be additionally controlled, especially in dry-cast composites, by changing the temperature, i.e., by imposing drying using a heated gas stream, prior to and during carbonation. As noted in FIG. 11B, elevating the reaction temperature substantially enhanced both $CO_2$ uptake and strength, resulting in the development of $\sigma_c$≈25 MPa in 24 h. This is attributed to both facilitated $CO_2$ transport due to the removal of water by evaporation (increased carbonation reaction rate), and the stimulation of OPC hydration and pozzolanic reactions (as indicated by $w_n/m_{OPC}$ in FIG. 11B). However, in agreement with the results for drying-induced changes in $S_w$, a temperature increase is beneficial to a limit—further increasing the temperature to 85° C. diminished both $CO_2$ uptake and strength gain on account of the insufficiency of pore water to support both $CO_2$ mineralization and OPC hydration reactions. This is attributed to: (a) the exothermic nature of carbonation reactions wherein temperature rise (unless the heat is rapidly dissipated) shifts the reaction equilibrium towards the reactants thereby resulting in a retardation in reaction progress; following Le Chatelier's principle, and (b) the rapid extraction of water, as a result of which carbonation and hydration are both suppressed due to the rapid decrease in the liquid saturation level in the pores. These observations suggest that use of a partially humidified $CO_2$ (flue gas) stream could favor carbonation in composites having low water contents (e.g., dry-cast composites) that are processed at higher temperatures. As an example, the flue gas emitted from a coal-fired power plant features temperatures (T) and a water vapor contents ($w_v$, v/v) on the order of 50° C.≤T≤140° C. and 12%≤$w_v$≤16%, respectively. The water (vapor) present in the flue gas could thus compensate for water loss due to evaporation at such temperatures.

Long-Term Strength Development of Carbonated Composites

Figure 12A:
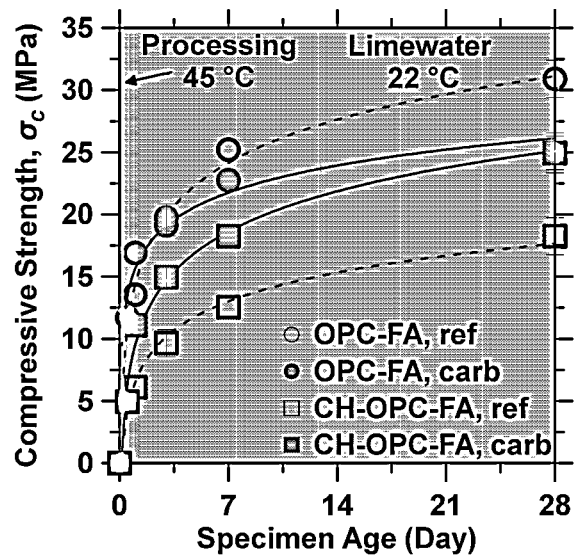
FIG. 12A shows the evolution of compressive strength.
Figure 12B:
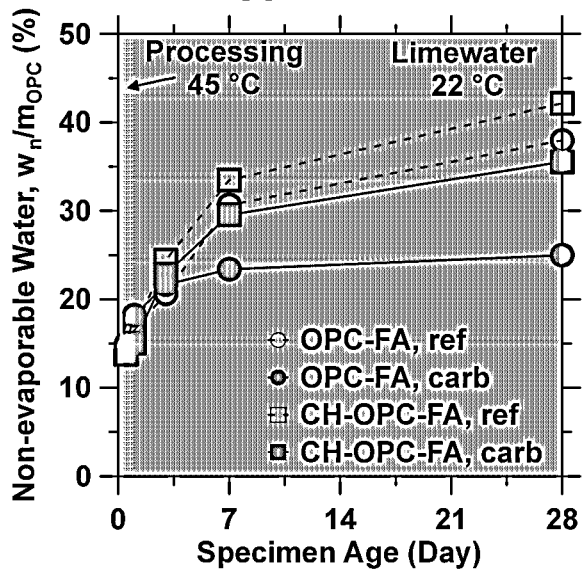
FIG. 12B shows the evolution of normalized non-evaporable water content.

The strength evolution of carbonated composites following an initial period of $CO_2$ processing is relevant because the compressive strength of cementitious materials at 28 days currently serves as an important criterion/specification/compliance attribute in structural design. Therefore, wet-cast portlandite-enriched composites with $S_w$=0.65 were either: (a) cured in saturated limewater (Ca(OH)$_2$ solution) at 22° C. for up to 28 d, or (b) carbonated for 12 h at 45° C. (in 12% $CO_2$, v/v) before curing in saturated limewater was continued until 28 d. To better assess the effects of portlandite enrichment, the strength evolutions of portlandite-free composites (i.e., where the binder was simply composed of OPC and FA) were also examined. In portlandite-free composites, carbonation induced a small increase in compressive strength and $CO_2$ uptake at early ages (≈3% by mass of binder) relative to the portlandite-enriched composites at an equivalent carbonation reaction time of 12 h. However, the rate of strength gain diminished over time (FIG. 12A) due to the coverage of reacting particle surfaces by carbonate (and perhaps C-S-H) precipitates, which hinders hydration and pozzolanic reactions relative to non-carbonated, and non-portlandite enriched composites in the longer term, i.e., see reduced non-evaporable water contents as shown in FIG. 12B. As a comment of substance: this draws into question the approach of carbonating fresh OPC-based composites with respect to late-age strengthening and durability. For instance, Zhang et al. reported that the carbonation of early-age OPC concrete can result in formation of carbonate precipitates on $C_3S/C_2S$ particles which can lead to suppression of strength at later ages during post-hydration. Furthermore, it has been noted that the reduced calcium hydroxide content of carbonated OPC-based concretes can increase the risk of corrosion of reinforcing steel. Similar reductions in the reactivity of OPC-based materials following carbonation have often been attributed to the formation of surficial barriers (e.g., as also relevant for prehydrated cements) on anhydrous and/or hydrated OPC phases (C-S-H and $Ca(OH)_2$), and to the consumption of $Ca(OH)_2$ during carbonation (see FIG. 12C).

In contrast, portlandite-enriched composites exposed to $CO_2$ featured strengths that are higher than that of the non-carbonated reference composite not only during $CO_2$ exposure but also when cured in limewater, manifesting a strength that is nearly 7 MPa (≈40%) higher after 28 days of aging (Figure A. OPC hydration in the carbonated portlandite-enriched composites, interestingly, was suppressed to only a minor degree relative to its non-carbonated reference (FIG. 12B) and was nearly equivalent to that of the hydrated portlandite-free binder. This nature of enhanced later-age strength development of the portlandite-enriched composites suggests that surface localization of carbonation products in the vicinity of the easier to carbonate portlandite grains results in reduced surface obstructions on OPC (and other reactant) particulates in these composites. Moreover, despite the significant consumption of portlandite during carbonation, the progress of pozzolanic reactions of carbonated portlandite-enriched binders proceeded unabated during curing, as represented by the progressive increase in non-evaporable water content (FIG. 12B) and the corresponding reduction in portlandite contents (FIG. 12C). It is furthermore observed that despite substantial portlandite consumption in the carbonated portlandite-enriched composite, residual portlandite remains that is not converted into $CaCO_3$. While this does suggest the potential to extend the carbonation processing window (i.e., to consume more portlandite), it shows an ability to explicitly control how much residual portlandite remains, e.g., to maintain a sufficient pH buffer to allow for the formation of passivation films on reinforcing steel surfaces as appropriate to hinder corrosion. Notably, the portlandite-enriched composite had an equivalent 28 d strength to the carbonated portlandite-free composite, while containing less than half of the OPC content and while taking up 4.3× more $CO_2$. Admittedly, this strength was around 83% that of the reference (non-carbonated) OPC-FA composite. However, the embodied $CO_2$ intensity of the carbonated portlandite-enriched composite is—conservatively, i.e., in spite of incomplete portlandite consumption—more than 50% lower when aspects of both $CO_2$ avoidance and uptake are taken into account. Further, by applying a slightly higher temperature as typical for flue gas exhaust, it is noted that portlandite-enriched dry-cast composites were able to deliver the same strength as their wet-cast counterparts (FIG. 11)—although in 24 h rather than 28 d, and once again, with a greatly reduced embodied $CO_2$ footprint.

This example has elucidated the potential of in situ $CO_2$ mineralization and the formation of carbonate precipitates as a pathway for: (a) ensuring the cementation of construction relevant components, and (b) as a means for enabling the utilization of dilute $CO_2$ waste streams at ambient pressure, and near-ambient temperatures with any need for pre-/post-treatment. The understanding gained offers new means to design low-$CO_2$ cementation agents that can serve as a functional replacement to OPC, the very $CO_2$-intensive cementation agent used by the construction sector for over a century. Special focus was paid to elucidate the roles of microstructure and pore (moisture) saturation on affecting $CO_2$ transport into 3D-monoliths, and the consequent impacts on the rate and progress of carbonation reactions and strength development. In general, while reducing pore saturation enhances carbonation, this is only true so long as $S_{w,c}$>0.10, below which the hindered dissolution of portlandite, in turn, suppresses carbonation. Unsurprisingly, dry-cast composites due to their lower water content, and the reduced surface coverage produced on their reactant surfaces (e.g., due to OPC hydration) are more effectively carbonated. Importantly, it is shown that the formation of carbonate precipitates is able to effectively bind proximate surfaces mineral particle surfaces thereby resulting in the carbonated dry-cast composites that achieve a compressive strength of ≈25 MPa in 24 h. It is furthermore shown that the formation of carbonate precipitates yields strengthening at the level of ≈15 MPa per unit of $CO_2$ uptake of reactants. This is substantially higher, e.g., than that noted by Wei et al. in their studies of fly ash carbonation. The outcomes of this work offer guidelines regarding process routes to develop portlandite-enriched cementation agents. This is significant as such novel binders, on account of their $CO_2$ uptake and avoidance, feature a $CO_2$ intensity that is substantially lower than that of typical OPC-based binders, which are commonly, today, diluted using fly ash. As an example, the global warming potential (GWP; kg $CO_2e/m^3$) associated with production of raw materials, transportation, and manufacturing of the concrete masonry units (CMUs) indicate that representative portlandite-enriched CMU formulations feature a GWP that is nearly 58% lower than that of typical OPC-dominant CMU formulations (Table S2 in SI). This GWP reduction is attributed to (i) the substitution of OPC with portlandite and fly ash ($CO_2$ avoidance), and (ii) the net negative $CO_2$ emissions associated with $CO_2$ uptake during manufacturing ($CO_2$ utilization). Evidently, the nature of processing conditions discussed herein are well-suited for the precast manner of fabrication. This creates opportunities to utilize portlandite-enriched binders to manufacture both masonry and precast components that can be used for both structural ("load bearing") and non-structural construction.

Supporting Information:
(A) Materials

Figure 13:
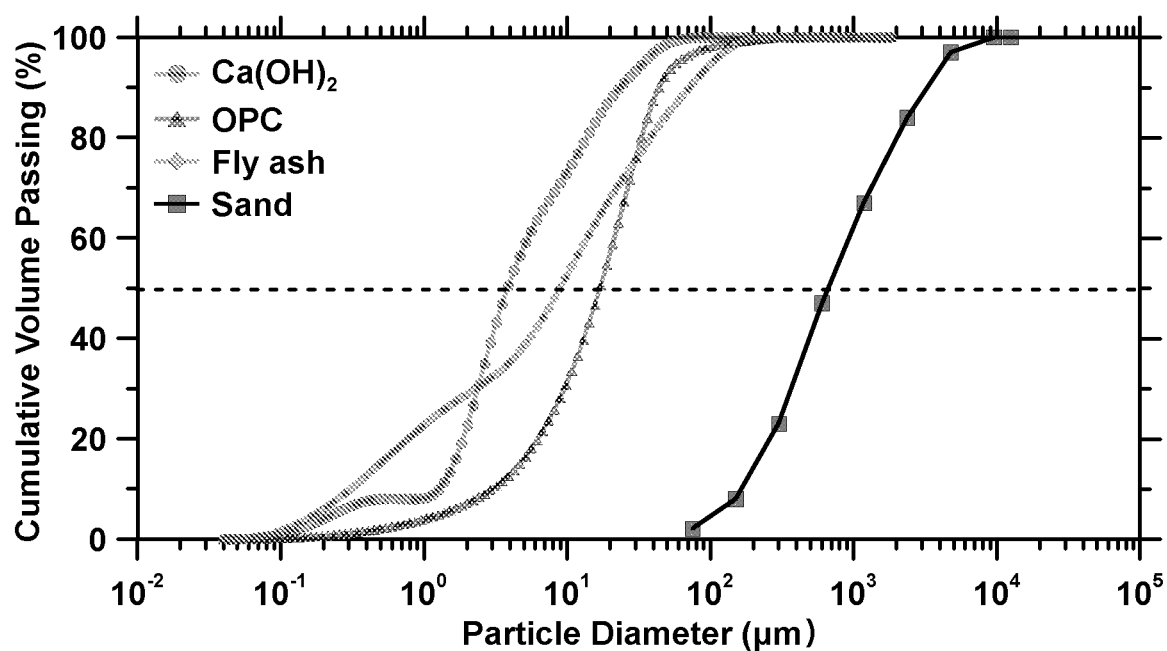
FIG. 13 shows particle size distributions of solids as determined by static light scattering (for binder materials) and sieve analysis (for sand). The median particle diameters ($d_{50}$) were 3.8 μm, 8.9 μm, and 17.2 μm for the portlandite, fly ash, and OPC, respectively.

The bulk oxide compositions of the ordinary portland cement (OPC) and fly ash as determined using X-ray fluorescence (XRF) are presented in Table S1. The densities of the portlandite, fly ash, and OPC were measured using helium pycnometry (Accupyc II 1340, Micromeritics) as: 2235 kg/m³, 2460 kg/m³, and 3140 kg/m³, respectively. The particle size distributions (PSDs) of the binder solids were measured using static light scattering (SLS; LS13-320, Beckman Coulter; see FIG. 13).

TABLE S1

Oxide composition (by mass) of the fly ash and OPC as determined by XRF.

| Oxide | Mass (%) | |
|---|---|---|
| | Fly ash | Type I/II OPC |
| $SiO_2$ | 60.84 | 21.21 |
| $Al_2O_3$ | 22.30 | 4.16 |
| $Fe_2O_3$ | 4.75 | 3.85 |
| $SO_3$ | 0.62 | 2.81 |
| CaO | 6.38 | 65.50 |
| $Na_2O$ | 2.07 | 0.18 |
| MgO | 1.80 | 1.98 |
| $K_2O$ | 1.23 | 0.32 |

(B) Drying and Carbonation Processing

Figure 14:
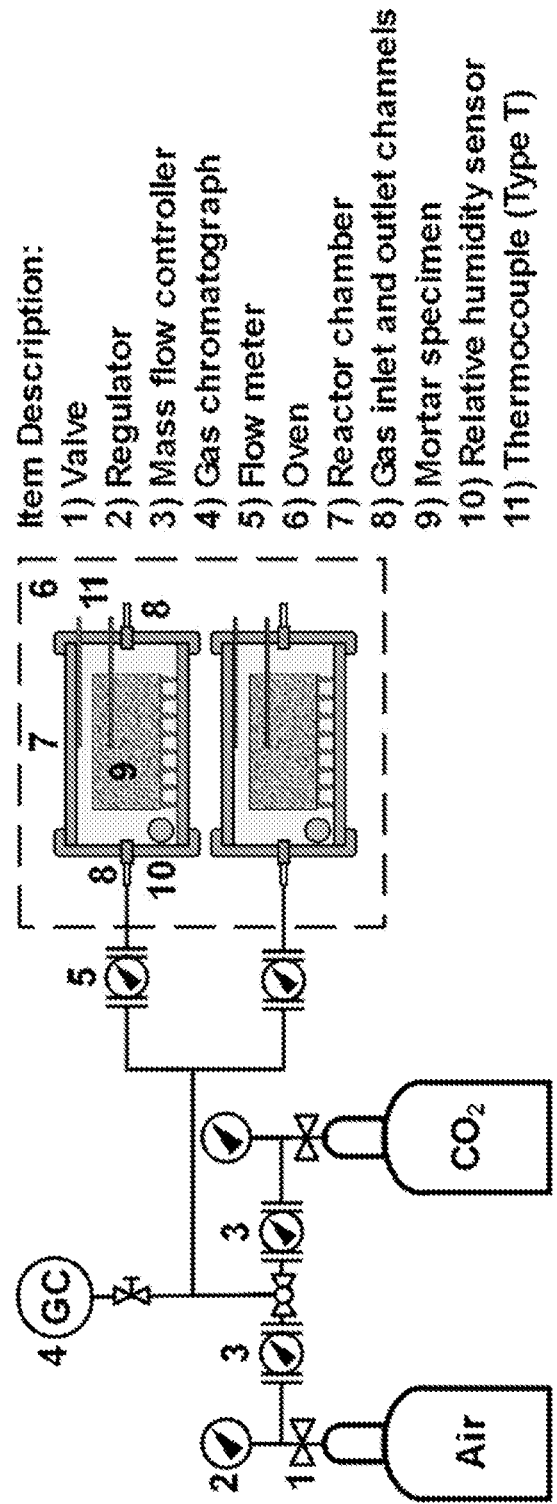
FIG. 14 shows a schematic of the drying and carbonation apparatus showing the flow-through reactors and related online instrumentation. The experiments were carried out at ambient pressure (p of about 1 bar).

A schematic of the drying and carbonation reactors and related online instrumentation is illustrated in FIG. 14.

(C) Experimental Methods

Moisture diffusion coefficient: The sides of the cylinders (50 mm×25 mm for wet-cast and 75 mm×25 mm for dry-cast; d×h) were sealed using a silicone sealant and aluminum tape to ensure 1-D diffusion. For this boundary conditions, Fick's $2^{nd}$ law can be expressed analytically using a Taylor expansion of the error function as follows:

$$\frac{m_t}{m_\infty} = 1 - \sum_{n=0}^{n=\infty} \frac{8}{(2n+1)^2\pi^2} \exp\left(\frac{-D_{tot}(2n+1)^2\pi^2 t}{4L^2}\right) \quad \text{Equation (S1)}$$

where $m_t$ (g) is the mass loss at a given time, $m_\infty$ (g) is the ultimate mass loss (i.e., at the infinite time; at equilibrium), t (s) is time, and L (m)=0.0125 m is half of the sample thickness.

(D) Kinetics of Drying Prior to Carbonation

Figure 15A:
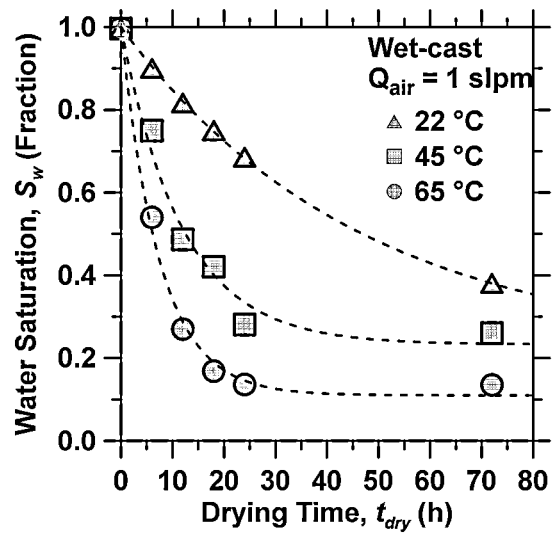
FIG. 15A shows the time-dependent evolution of water saturation level, $S_w$, for wet-cast composites at different drying temperatures
Figure 15B:
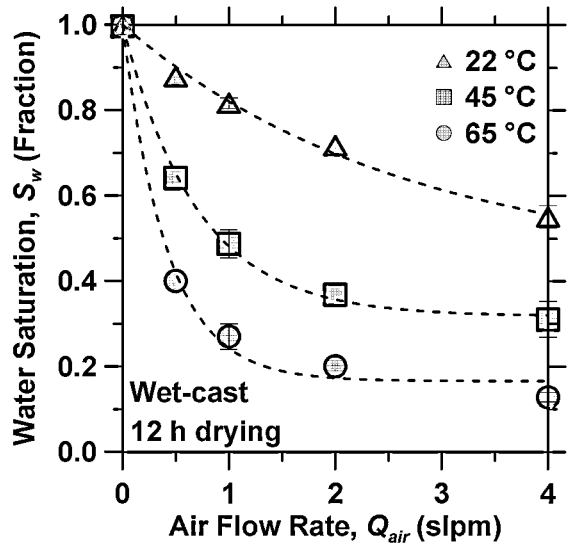
FIG. 15B shows the time-dependent evolution of water saturation level, $S_w$, for wet-cast composites at different drying air flow rates.

The effects of temperature and air flow rate on the drying kinetics of wet-cast composites ("mortars") and the reduction in the degree of liquid saturation, $S_w$, are shown in FIGS. 15A and B. Expectedly, higher temperatures or air flow rates accelerated drying and resulted in a prominent decrease in $S_w$. $S_w$ plateaued over time under all drying conditions, and more rapidly so at higher temperatures. This plateau indicates a progressive transition in the size of pores from which water is removed. Specifically, as the internal RH diminishes, water is first drawn out from larger and percolated pores, and thereafter smaller sub-micron and disconnected pores. FIG. 15C shows the effect of compaction pressure on increasing $S_w$ for dry-cast composites that is induced by decreasing their total porosity.

(E) Carbonation Strengthening

FIG. 16 displays the evolution of compressive strength as a function of the non-evaporable water content, $w_n/m_{OPC}$, for wet-cast composites across increasing carbonation durations. Significantly, the compressive strengths developed in carbonated composites are equivalent or superior to the sealed cured composites wherein, in the latter, strength development is simply ensured by the hydration of OPC.

FIG. 17 displays the dependence of slope of strength—$w_n/m_{OPC}$ relation on drying conditions.

Figure 18A:
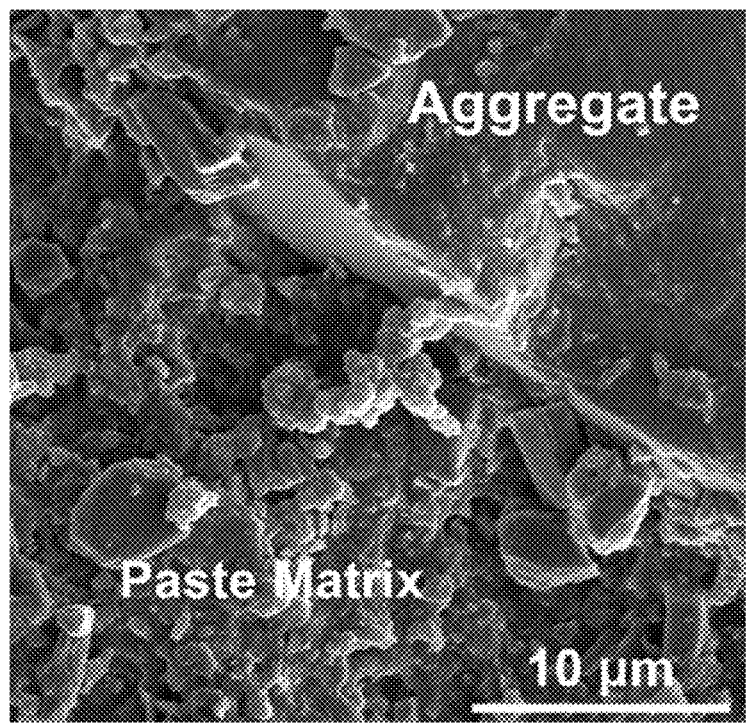
FIG. 18A provides a representative SEM micrographs showing surface morphology and formation of carbonate products (identified by SEM-EDS analysis) for wet-cast composite ($w_n/m_{OPC}$=11.5%) and FIG. 18B provides a representative SEM micrographs showing surface morphology and formation of carbonate products (identified by SEM-EDS analysis) for dry-cast composite ($w_n/m_{OPC}$=4.8%).
Figure 18B:
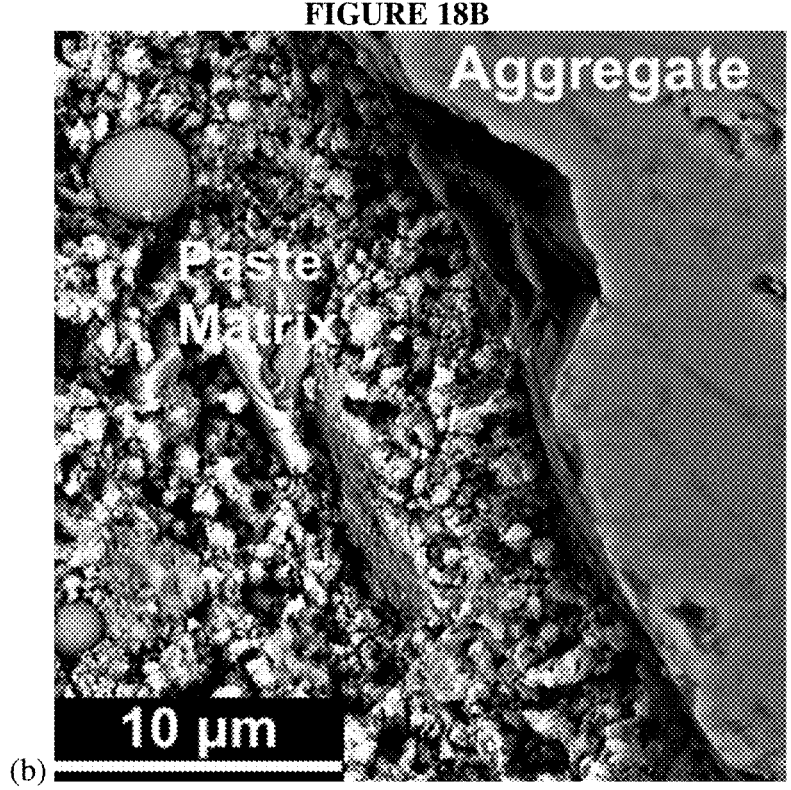

FIGS. 18A and B compare the microstructure and surface morphology of carbonated wet-cast and dry-cast composites at varying degrees of hydration. The images were acquired using a field emission-scanning electron microscope with an energy dispersive X-ray spectroscopy detector (SEM-EDS; FEI NanoSEM 230). For a given time, cross-sectional disks were taken from the cylinders and immersed in IPA for 7 days to suppress OPC hydration. The disks were then vacuum-dried in a desiccator for 7 days, before small coupons were taken from the disks and impregnated with epoxy, polished, and gold-coated. All SEM micrographs were acquired in secondary electron mode with a spot size of 4.0 nm, at an accelerating voltage of 10 kV, and a working distance between ≈5.5 mm.

(F) Representative Sustainability Implications/Assessments

The global warming potential (GWP; kg $CO_2e/m^3$) of representative portlandite-enriched concrete masonry units (CMUs) has been estimated in line with the Environmental Product Declaration (EPD) methodology and compared with the OPC-based CMUs. For concrete masonry products, this is described by the product category rule (PCR): "ASTM International. ASTM International PCR005: Product Category Rules for Preparing an Environmental Product Declaration for Manufactured Concrete and Concrete Masonry Products, 2014; p 21." EPDs following this PCR use the product stage as the system boundary, and therefore include three modules: (1) raw materials supply, (2) transport to the manufacturer, and (3) manufacturing. The declared unit is 1 $m^3$ of concrete masonry products. Table S2 provides a comparative evaluation of the GWP of each module of a Canadian industry-averaged EPD (representative of conventional OPC-based CMU) against the GWP of a representative portlandite-enriched binder designed for CMU fabrication. This calculation indicates that the portlandite-enriched CMU features a GWP that is ≈58% less than that of conventional OPC-based CMU. This reduction is attributed to (i) the substitution of OPC with portlandite and fly ash ($CO_2$ avoidance), and (ii) the net negative $CO_2$ emissions associated with $CO_2$ uptake during manufacturing ($CO_2$ utilization).

TABLE S2

The comparative global warming potential (GWP, kg $CO_2e/m^3$) for portlandite-enriched and OPC-concrete masonry based on a cradle-to-gate analysis. The declared unit is 1 $m^3$ of concrete formed into masonry units (CMUs) as per applicable product category rules.

| Module | GWP of OPC-based CMU (kg $CO_2e/m^3$) [sourced from CCMPA average EPD] | GWP of Portlandite-enriched CMU (kg $CO_2e/m^3$) |
|---|---|---|
| A1: Raw Material Supply | 170 | 103 |
| A2: Transport to Manufacturer | 27 | 27 |
| A3: Manufacturing | 63 | −21 |
| Total (A1 + A2 + A3) | 260 | 109 |

As used herein, the singular terms "a," "an," and "the" include plural referents unless the context clearly dictates otherwise. Thus, for example, reference to an object can include multiple objects unless the context clearly dictates otherwise.

As used herein, the terms "connect," "connected," and "connection" refer to an operational coupling or linking. Connected objects can be directly coupled to one another or can be indirectly coupled to one another, such as via one or more other objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A manufacturing process of a low-carbon concrete product, comprising:
    forming a cementitious slurry including portlandite;
    shaping the cementitious slurry into a structural component, wherein shaping the cementitious slurry comprises compacting the cementitious slurry at a pressure in a range of about 0.5 MPa to about 50 MPa; and
    exposing the structural component to a post-combustion or post-calcination flue gas stream containing $CO_2$, thereby enabling manufacture of the low-carbon concrete product.

2. The manufacturing process of claim 1, wherein forming the cementitious slurry includes combining water and a binder including the portlandite and optionally cement and coal combustion residuals at a water-to-binder mass ratio (w/b) of about 0.5 or less.

3. The manufacturing process of claim 2, wherein w/b is about 0.45 or less.

4. The manufacturing process of claim 1, wherein forming the cementitious slurry includes combining water and a binder including a cement, portlandite, and coal combustion residuals, at a mass percentage of the cement in the binder of about 25% or greater and up to about 50%.

5. The manufacturing process of claim 4, wherein the mass percentage of the cement in the binder is about 30% or greater.

6. The manufacturing process of claim 1, further comprising drying the structural component prior to exposing the structural component to the post-combustion or post-calcination flue gas stream containing $CO_2$.

7. The manufacturing process of claim 6, wherein drying the structural component includes reducing a degree of pore water saturation ($S_w$) to less than 1.

8. The manufacturing process of claim 7, wherein $S_w$ is about 0.9 or less.

9. The manufacturing process of claim 6, wherein drying the structural component includes reducing $S_w$ to a range of about 0.1 to about 0.7.

10. The manufacturing process of claim 6, wherein drying the structural component is performed at a temperature in a range of about 20° C. to about 85° C., for a time duration in a range of 1 h to about 72 h.

11. The manufacturing process of claim 1, wherein compacting the cementitious slurry includes reducing a degree of water saturation ($S_w$) to less than 1.

12. The manufacturing process of claim 11, wherein $S_w$ is about 0.9 or less.

13. The manufacturing process of claim 11, wherein compacting the cementitious slurry includes reducing $S_w$ to a range of about 0.1 to about 0.7.

14. The manufacturing process of claim 1, wherein exposing the structural component to the post-combustion or post-calcination flue gas stream containing $CO_2$ is performed at ambient pressure and at a temperature in a range of about 20° C. to about 80° C.

15. The manufacturing process of claim 1, wherein the low-carbon concrete products have up to 75% lower embodied carbon intensity than a traditional cement-based concrete product.

16. The manufacturing process of claim 15, wherein the lower carbon intensity is due to (a) partial substitution of cement with portlandite and/or fly ash and/or (b) $CO_2$ uptake during manufacturing.

* * * * *